United States Patent
Hirohashi et al.

(12) 
(10) Patent No.: US 7,526,155 B2
(45) Date of Patent: Apr. 28, 2009

(54) ROTARY JOINT

(75) Inventors: Kazutoshi Hirohashi, Kanagawa-ken (JP); Masahisa Sakai, Kanagawa-ken (JP)

(73) Assignee: Victor Company of Japan, Limited, Yokohama-shi (JP)

( * ) Notice: Subject to any disclaimer, the term of this patent is extended or adjusted under 35 U.S.C. 154(b) by 4 days.

(21) Appl. No.: 11/898,403

(22) Filed: Sep. 12, 2007

(65) Prior Publication Data

US 2008/0069495 A1 Mar. 20, 2008

(30) Foreign Application Priority Data

Sep. 14, 2006 (JP) .......................... P2006-249652
Nov. 22, 2006 (JP) .......................... P2006-315584

(51) Int. Cl.
*G02B 6/26* (2006.01)
*G02B 6/42* (2006.01)

(52) U.S. Cl. .......................................... 385/26; 385/25
(58) Field of Classification Search .................... 385/26
See application file for complete search history.

(56) References Cited

U.S. PATENT DOCUMENTS

| 4,711,516 | A | * | 12/1987 | Graber | .......................... | 385/26 |
| 4,900,117 | A | * | 2/1990 | Chen | .......................... | 385/26 |
| 7,194,154 | B2 | * | 3/2007 | Hyatt | .......................... | 385/25 |
| 7,248,761 | B2 | * | 7/2007 | Schilling et al. | .............. | 385/25 |
| 7,376,299 | B2 | * | 5/2008 | Schorpp et al. | ............... | 385/25 |

FOREIGN PATENT DOCUMENTS

| JP | 05-072436 | 3/1993 |
| JP | 09-243851 | 9/1997 |
| JP | 2001-044940 | 2/2001 |
| JP | 2001-183738 | 7/2001 |
| JP | 2001-305381 | 10/2001 |
| JP | 2003-123178 | 4/2003 |
| JP | 2004-064430 | 2/2004 |
| JP | 2004-111696 | 4/2004 |
| JP | 2004-128729 | 4/2004 |

* cited by examiner

*Primary Examiner*—Tina M Wong
(74) *Attorney, Agent, or Firm*—The Nath Law Group; Jerald L. Meyer; Sungyeop Chung

(57) ABSTRACT

A rotary joint 1 capable of stably transmitting superfine images and high-speed data is provided. The rotary joint 1 includes a stationary part 3 and a rotary part 2 rotatable about an axis against the stationary part 3 and transmits light signals between the stationary part 3 and the rotary part 2. The rotary part 2 includes at least one light transmissive cylindrical member 101 arranged coaxially with the axis, a light emitting element 11 and a light receiving element 14 both arranged on one end of the member 101. While, the stationary part 3 includes a light receiving element 12 opposed to the light emitting element 11 in the rotary part 2 and a light emitting element 13 opposed to the light receiving element 14 in the rotary part 2.

13 Claims, 17 Drawing Sheets

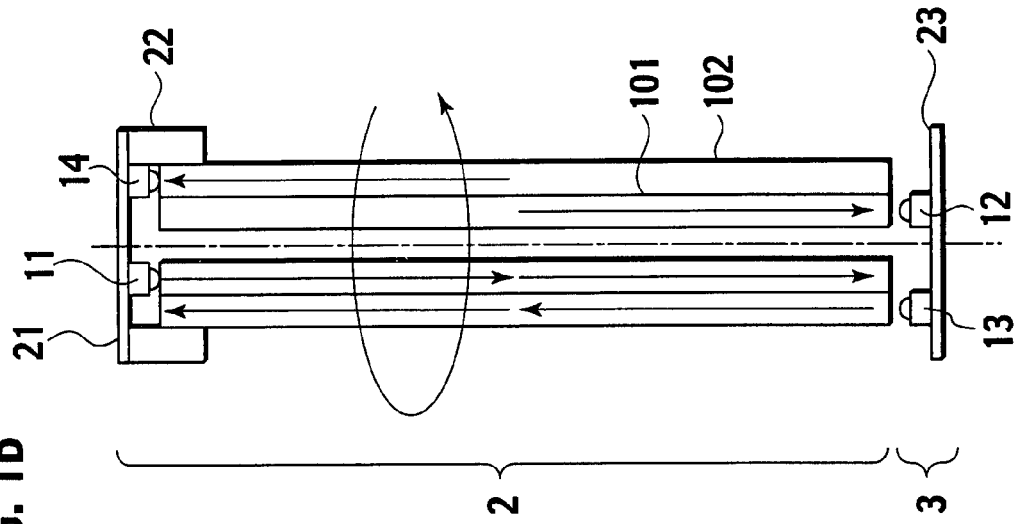
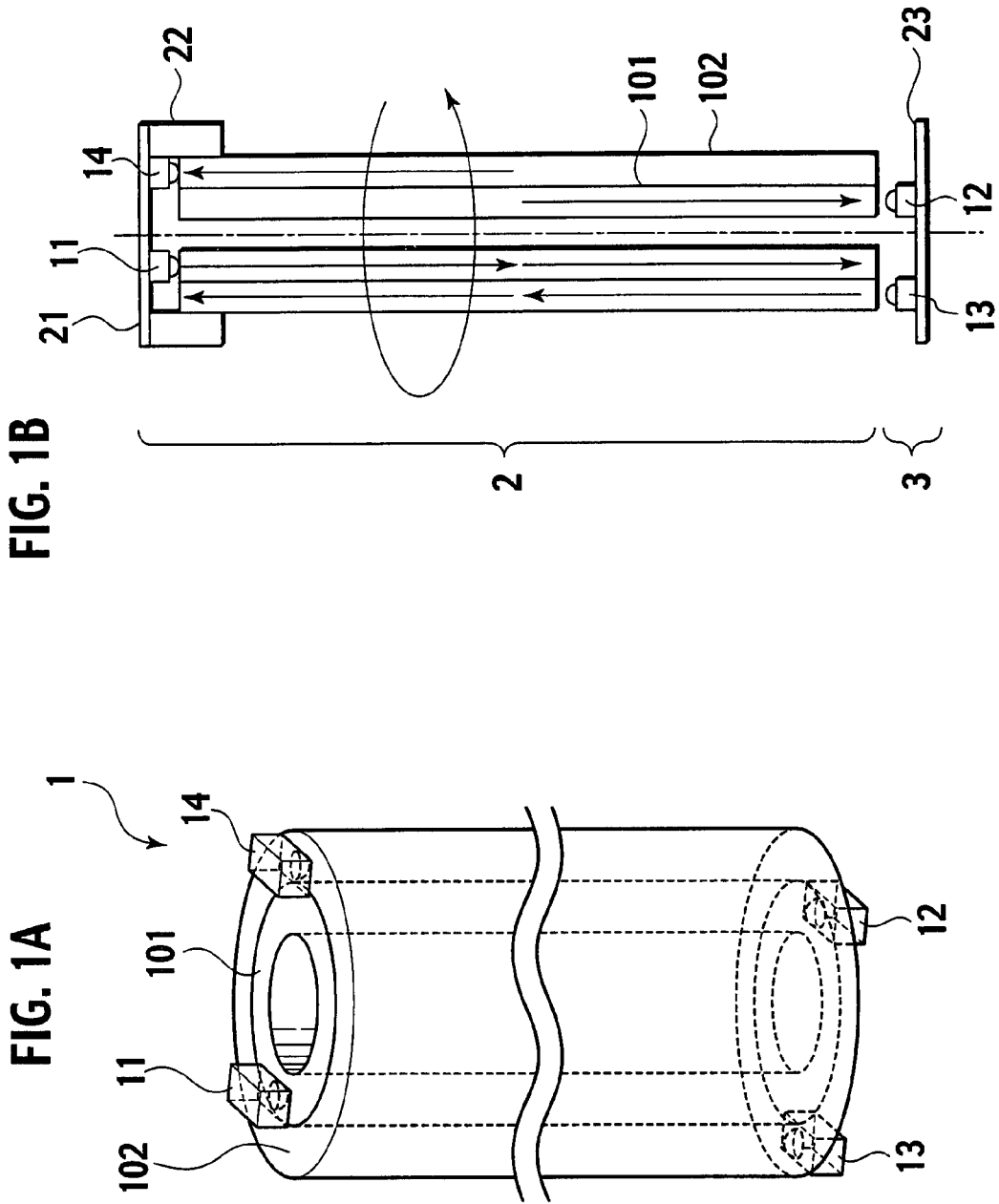

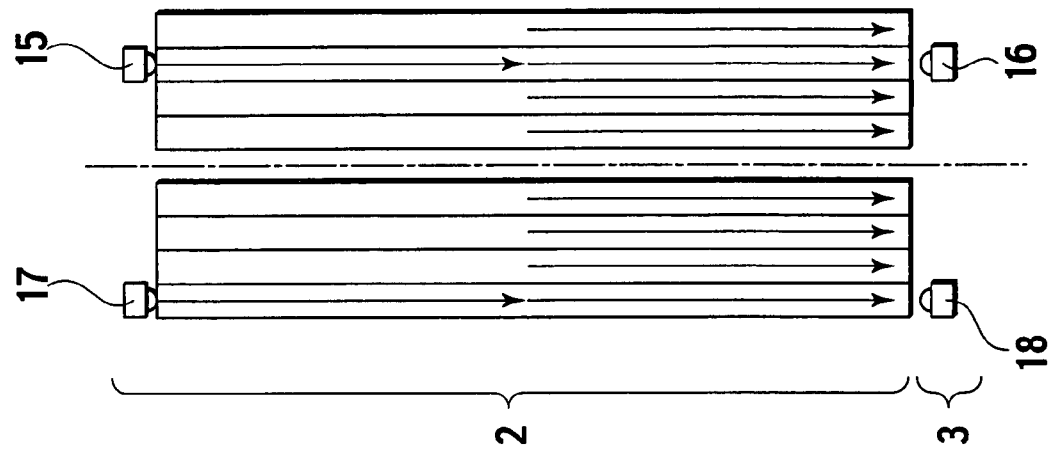
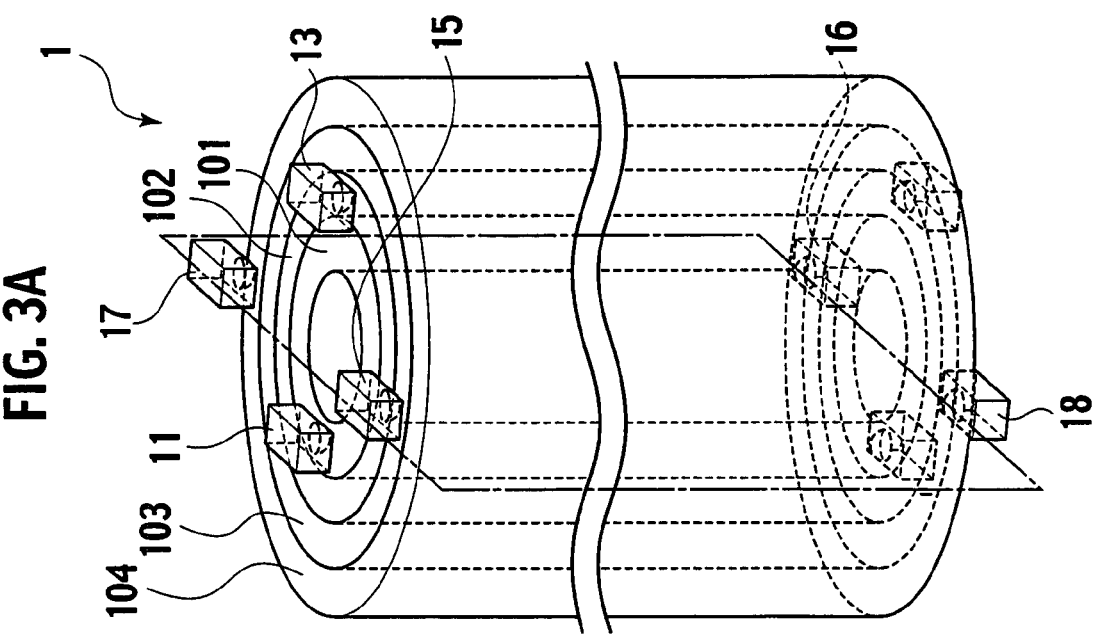

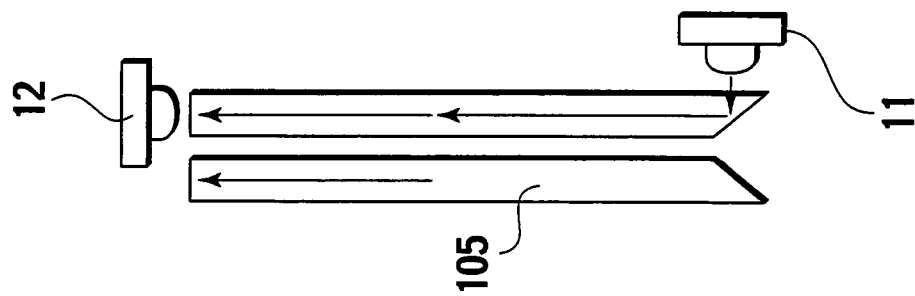
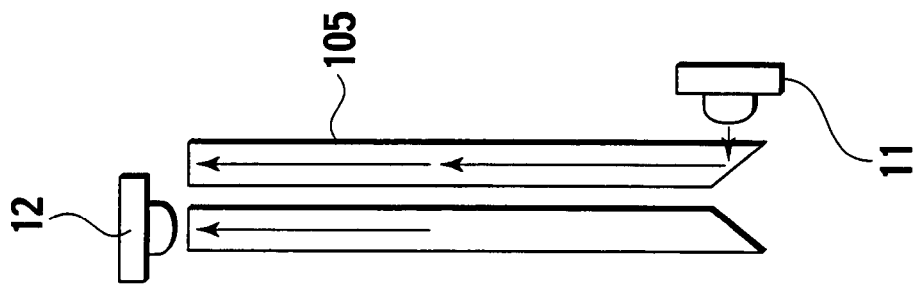
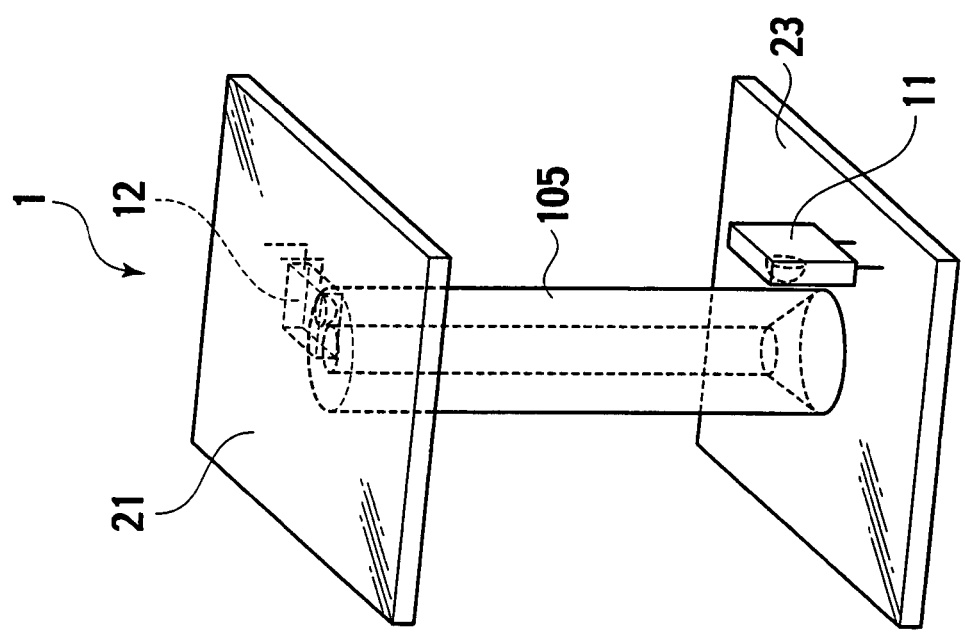

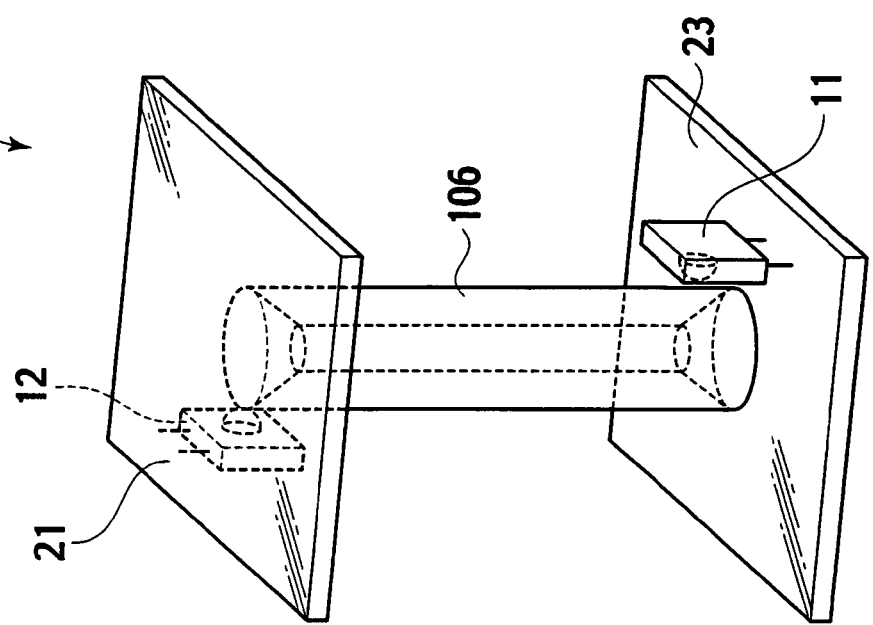
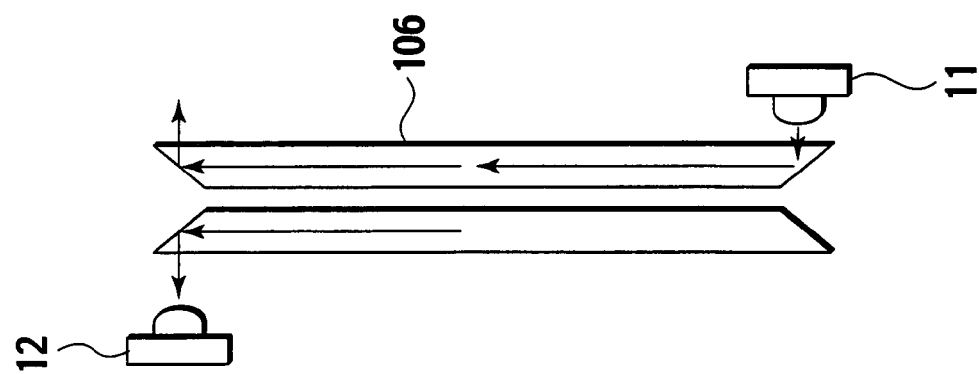
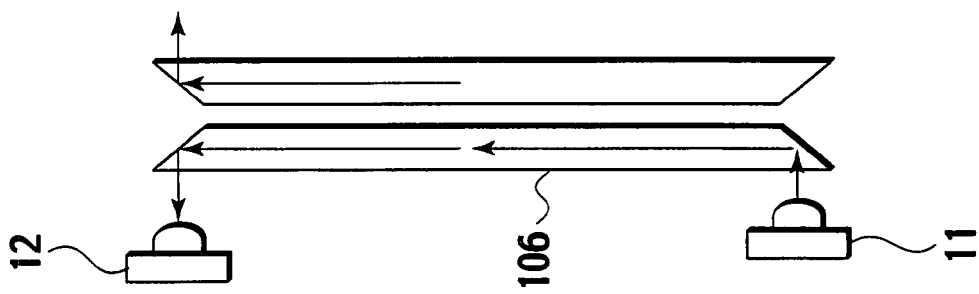

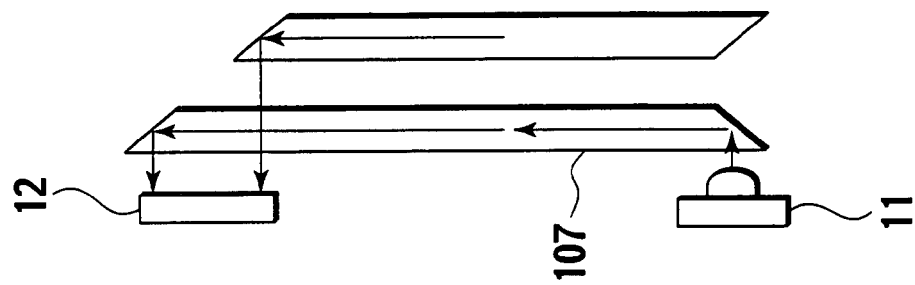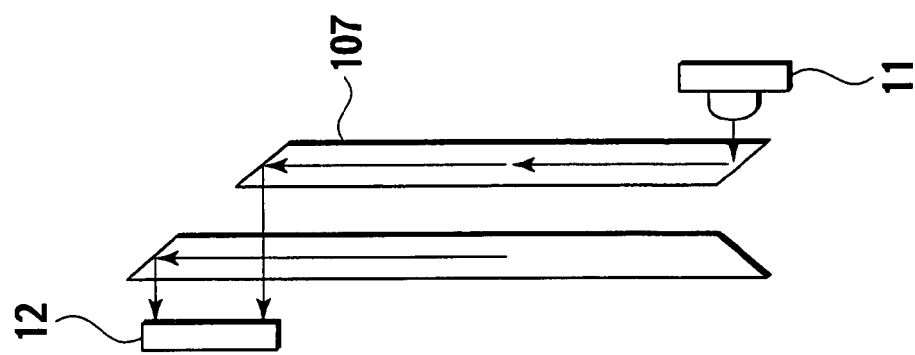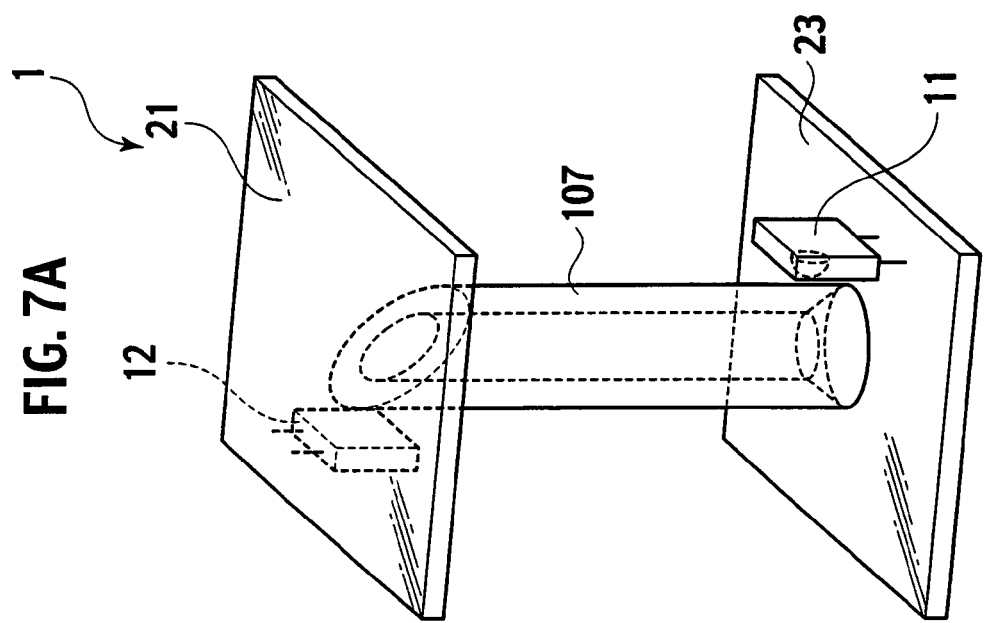

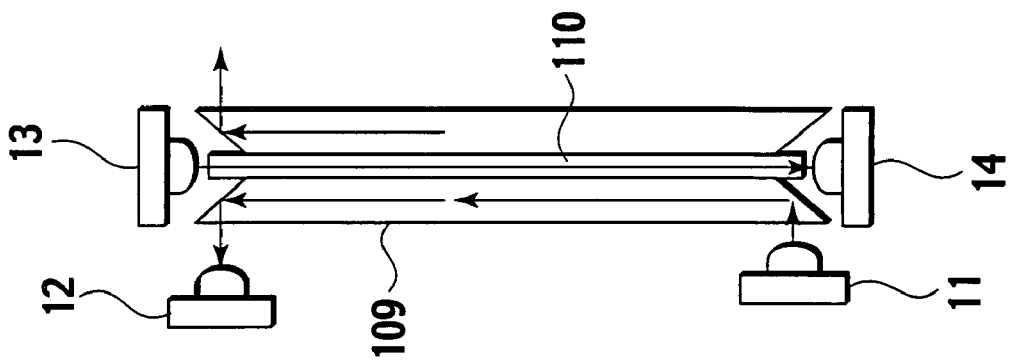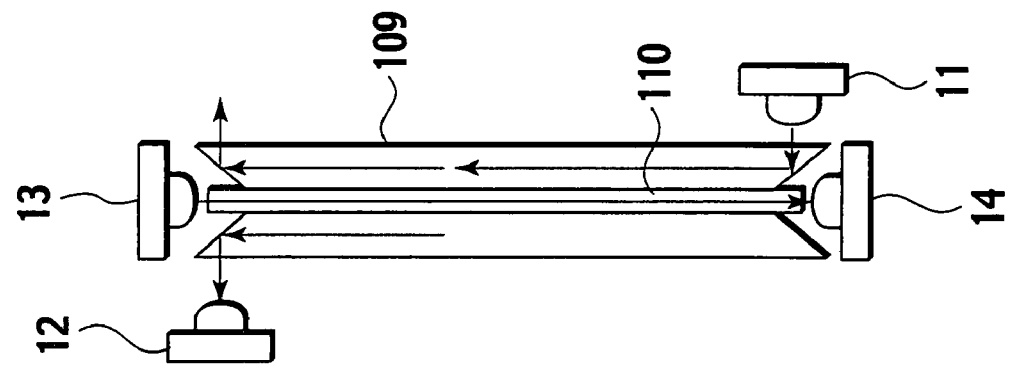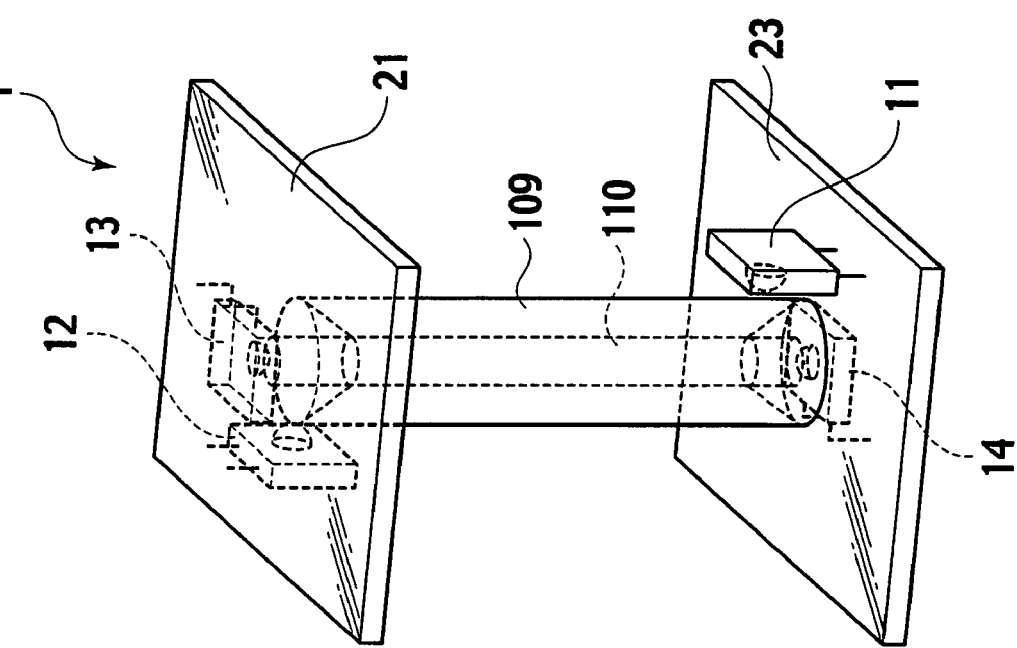

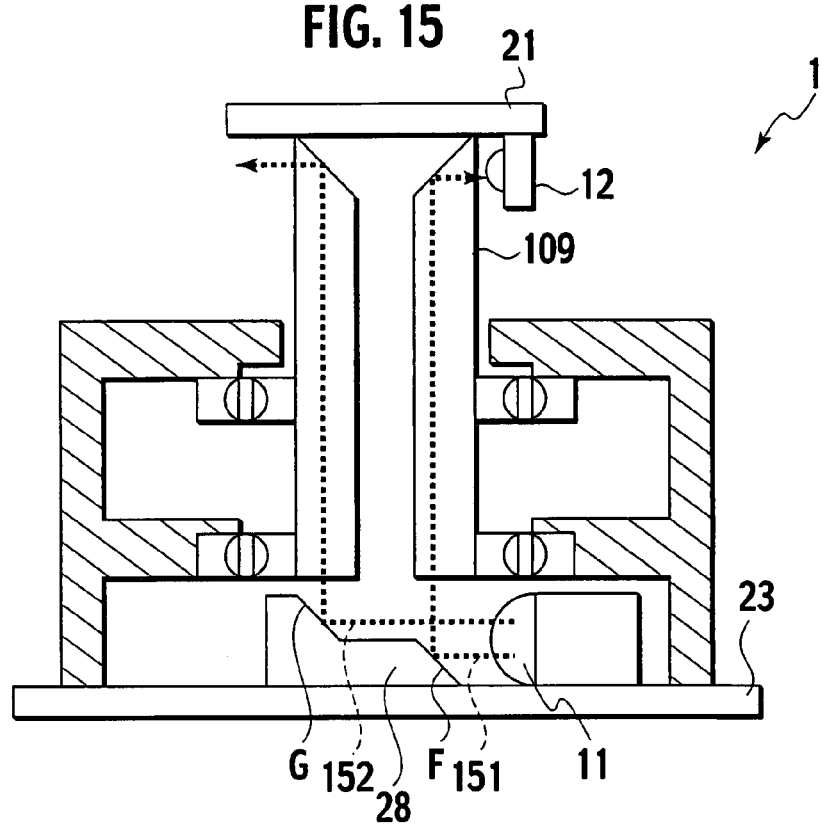
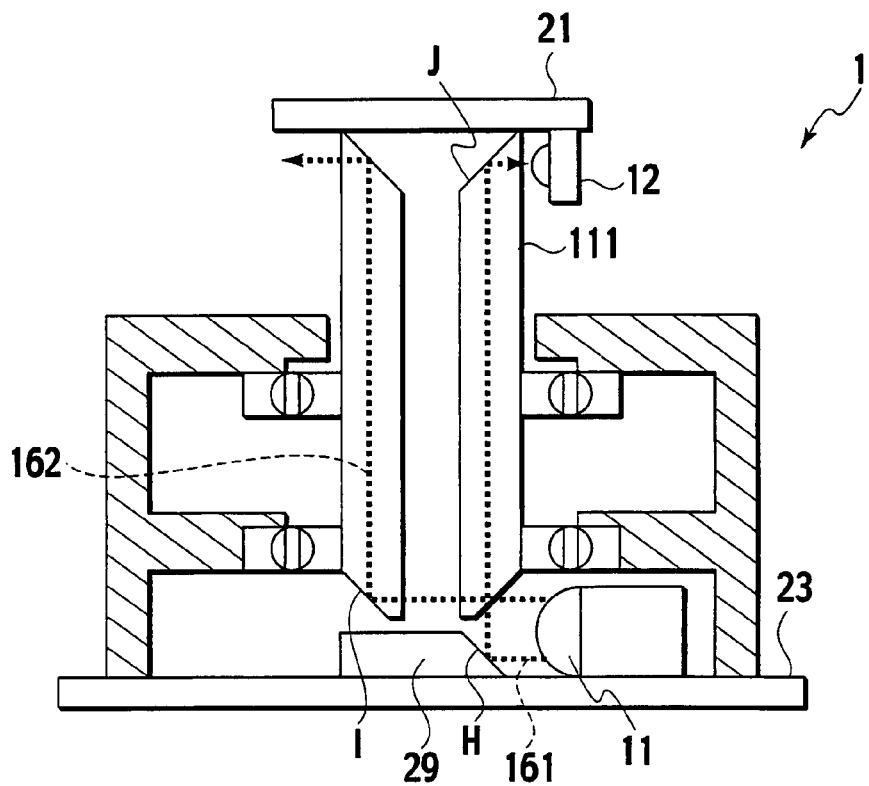

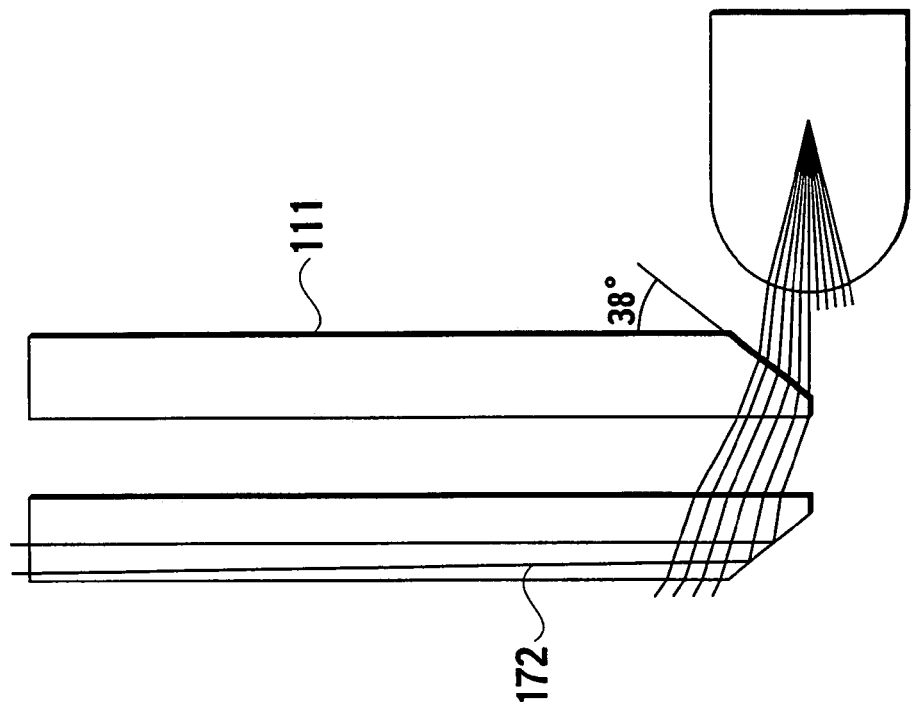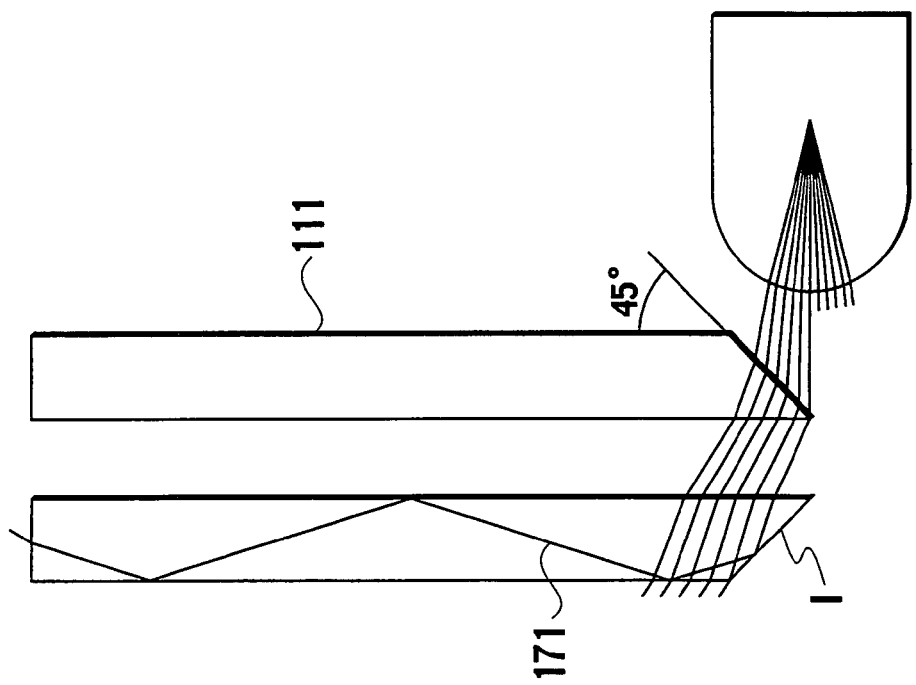

ROTARY JOINT

BACKGROUND OF THE INVENTION

1. Field of the Invention

The present invention relates to a rotary joint for accomplishing an optical transmission of signals between a stationary part and a rotary part rotatably assembled to the stationary part.

2. Description of Related Art

As surveillance cameras devices built in an indoor ceiling etc., there are a number of surveillance camera devices that conduct surveillance at variable imaging directions while controlling a pan angle of a camera and its tilt angle, in widespread use. In common with many surveillance camera devices capable of controlling camera angles, a device's movable part rotatable in panning is connected with a stationary part built in a ceiling or the like through the intermediary of an electric camera-platform. That is, in the majority of surveillance cameras devices, the movable part having the camera equipped with a tilting mechanism for rotating the camera in the direction of tilting is attached to one part (movable part) of the electric camera-platform rotatable in the direction of pan, while the other part (immovable part) of the camera-platform is attached to the stationary part. In the so-constructed surveillance cameras device, image signals are generated from the camera mounted on the movable part. Next, the image signals are transmitted to the stationary part through the electric camera-platform. In the stationary part, image processing or conversion for output interface is applied on the image signals and subsequently, the so-processed image signals are outputted to an outside monitor, an image-signal recorder or the like.

There are many types of electronic camera-platform for the surveillance cameras device known in the prior art. As for the electronic camera-platform capable of swiveling the movable part in the direction of pan continuously, particularly, there is known an electronic camera-platform where a sliding contact between a slip ring and a brush constitutes a signal connection route for bridging over signals between a swivel part and a stationary part by. However, this kind of electronic camera-platform has a lot of shortcomings, for instance, unstable electrical contact between the slip ring and the brush caused by adhesion of oil slick and dusts, noise pollution accompanied with mechanical contact between the slip ring and the brush, deterioration in the performance of electrical contacting, etc. Particularly, there has arisen an occurrence of noise with the swivel movement in transmitting image signals and an occurrence of malfunctions in transmitting control signals for panning and tiling the camera. Additionally, such a transmission adopting mechanical contacts has a limited range of transmissible frequencies, so that it is impossible to transmit superfine image signals and high-speed data. For this reason, there has been desired appropriate connecting means that is capable of transmitting the image signals and data with high quality and at a high speed without deteriorating its transmission performance in spite of the long-term using.

Under the above circumference, a rotary optical coupling device for transmitting and receiving electric signals in non-contact manner is disclosed in Japanese Patent Publication Laid-open No. 2001-44940. In the publication, the rotary optical coupling device includes light emitting elements and light receiving elements in two pairs. In arrangement, the light receiving element on the stationary side and the light receiving element on the rotary side are arranged so as to oppose each other at the substantial center of a rotating axis of the device. Outside these light receiving elements, the light emitting elements are arranged so as not to overlap with the light receiving elements, respectively. In operation, the light emitting elements emit their light beams against respective centers of the mating light receiving elements obliquely.

SUMMARY OF THE INVENTION

In the rotary optical coupling device mentioned above, the optical transmission between the light emitting elements and the light receiving elements is carried out through free space as medium. Thus, the transmitted light is dispersed until it reaches the mating light receiving element, causing the amount of light received by the same element to be reduced. While, it is advantageous for the light emitting element to transmit the light in the form of a beam in order to avoid the reduction in the amount of light received. In this measure, however, it is necessary to align an optical axis of the beam with the light receiving element precisely, causing the manufacturing cost of the device to be elevated. Actually, it is impossible to enhance the directivity of the transmitted light remarkably. Therefore, in the rotary optical coupling device of the above publication, it is difficult to deal with superfine images and high-speed data requiring high S/N ratio in order to ensure the transmission quality.

Additionally, in the rotary optical coupling device of the above publication, it is indispensable that a center light transmissive cylinder for leading wires accommodates a variety of wires for transmitting signals to the light emitting elements, signals from the light receiving elements and for supplying electrical power to a base plate (substrate) of the device. In case of superfine images and high-speed data to be handled, such a structure would incur an adoption of a coaxial cable for wiring or two coaxial cables (in case of differential transmission) with respect to one signal transmission line, requiring the inner diameter of the center light transmissive cylinder to be enlarged. Consequently, there arises a problem of increasing the size of the device and its manufacturing cost.

Under a situation mentioned above, an object of the present invention is to provide a rotary joint adopting an optical transmission between a stationary part and a rotary part rotatably assembled to the stationary part, which can miniaturize a device and transmit even superfine images and high-speed data stably.

In order to achieve the above objects, according to a first aspect of the present invention, there is provided a rotary joint for transmitting optical signals, comprising a stationary part and a rotary part which is rotatable about an axis against the stationary part, wherein the rotary part includes a rotary base plate, a light transmissive cylindrical member formed with a predetermined thickness, the light transmissive cylindrical member being fixed on the rotary base plate coaxially with the axis, and a first optical element arranged on one end of the light transmissive cylindrical member in an axial direction thereof and fixed on the rotary base plate, and the stationary part includes a stationary base plate arranged closely to the other end of the light transmissive cylindrical member and a second optical element fixed on the stationary base plate close to the other end of the light transmissive cylindrical member, the second optical element pairing with the first optical element of the rotary part, whereby the optical signals are transmitted between the first optical element and the second optical element through the light transmissive cylindrical member.

According to a second aspect of the present invention, there is also provided a rotary joint for transmitting optical signals, comprising a stationary part and a rotary part which is rotatable about an axis against the stationary part, wherein the rotary part includes a rotary base plate, a plurality of light transmissive cylindrical members each formed with a predetermined thickness, the light transmissive cylindrical members being arranged concentrically with the axis and fixed on the rotary base plate coaxially with the axis, and a first optical element arranged with respect to each of the light transmissive cylindrical members and positioned close to one end of the each light transmissive cylindrical member in an axial direction thereof and fixed on the rotary base plate, and the stationary part includes a stationary base plate arranged closely to the other ends of the light transmissive cylindrical members and a second optical element arranged with respect to each of the light transmissive cylindrical members and fixed on the stationary base plate close to the other end of the each light transmissive cylindrical member, the second optical element pairing with the first optical element of the rotary part, whereby the optical signals are transmitted between the first optical element and the second optical element through the light transmissive cylindrical member.

BRIEF DESCRIPTION OF THE DRAWINGS

FIG. 1A is a perspective structural view of a rotary joint in accordance with an embodiment of the present invention;

FIG. 1B is a longitudinal sectional view of the rotary joint of the embodiment;

FIG. 3A is a perspective structural view of a rotary joint using four light transmissive cylindrical members;

FIG. 3B is a longitudinal sectional view of the rotary joint of the rotary joint of FIG. 3A;

FIG. 5A is a perspective structural view of a rotary joint of a first modification of the embodiment of the present invention;

FIG. 5B is a longitudinal sectional view of the rotary joint of the first modification;

FIG. 5C is a longitudinal sectional view of the rotary joint of the first modification;

FIG. 6A is a perspective structural view of another rotary joint of the first modification but tapered surfaces at both ends of the rotary joint.

FIG. 6B is a longitudinal sectional view of the rotary joint of FIG. 6A;

FIG. 6C is a longitudinal sectional view of the rotary joint of FIG. 6A;

FIG. 7A is a perspective structural view of a rotary joint of a second modification of the embodiment of the present invention;

FIG. 7B is a longitudinal sectional view of the rotary joint of the second modification;

FIG. 7C is a longitudinal sectional view of the rotary joint of the second modification;

FIG. 9A is a perspective structural view of a rotary joint of a fourth modification of the embodiment of the present invention;

FIG. 9B is a longitudinal sectional view of the rotary joint of the fourth modification;

FIG. 9C is a longitudinal sectional view of the rotary joint of the fourth modification;

FIG. 15 is a longitudinal sectional view of a rotary joint of a ninth modification of the embodiment of the present invention;

FIG. 16 is a longitudinal sectional view of a rotary joint of a tenth modification of the embodiment of the present invention;

FIGS. 17A and 17B are views explaining an inclination angle of an end face of a light transmissive cylindrical member of the rotary joint of the tenth modification;

DETAILED DESCRIPTION OF THE PREFERRED EMBODIMENT

Figure 2B:
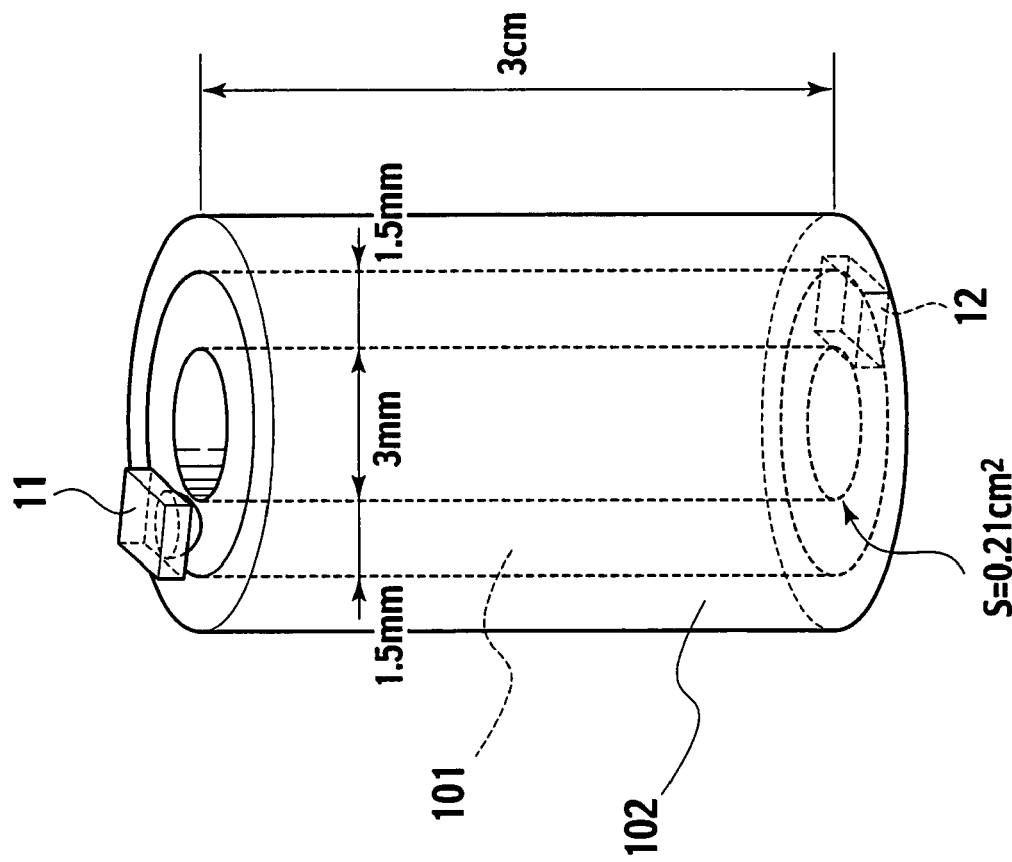
FIG. 2B is a view showing a transmission situation where beam from a light emitting element is transmitted through the rotary joint of the embodiment.

There will be described an embodiment of the present invention with reference to drawings.

We now illustrate an explanation of this embodiment by citing the example of a rotary joint that employs, as optical transmission medium between a light emitting element and a light receiving element, two light transmissive cylindrical members molded by light transmissive resin and performs an interactive optical communication between these elements.

FIGS. 1A and 1b are structural views showing a rotary joint in accordance with one embodiment of the present invention.

In detail, FIG. 1A is a perspective "three-dimensional" view of the rotary joint 1 of this embodiment. FIG. 1B is a sectional view of the rotary joint 1 of the embodiment.

As shown in FIG. 1B, the rotary joint 1 includes a rotary part 2 and a stationary part 3. The rotary part 2 is carried so as to be rotatable about an axis in relation to the stationary part 3.

The rotary part 2 includes a first light transmissive cylindrical member 101 formed with a predetermined thickness and a second light transmissive cylindrical member 102 also formed with a predetermined thickness. The second light transmissive cylindrical member 102 is positioned outside the first cylindrical member 101 concentrically and coaxially with the axis. In the rotary part 2, a light emitting element 11 and a light receiving element 14 (as optical elements) are arranged on a rotary base plate 21. In arrangement, the light emitting element 11 is positioned so as to oppose one end face of the first cylindrical member 101, while the light receiving element 14 is positioned so as to oppose one end face of the second cylindrical member 102.

The first and second cylindrical members 101, 102 are fixed to the rotary base plate 21 by a plate fixing member 22.

On the other hand, the stationary part 3 includes a light receiving element 12 (as one optical element), a light emitting element 13 (as one optical element) and a stationary base plate 23 mounting these elements 12, 13 thereon. In arrangement, the light receiving element 12 is positioned so as to oppose the other end face of the first cylindrical member 101, while the light emitting element 13 is positioned so as to oppose the other end face of the second cylindrical member 102.

Light (beam) transmitted from the light emitting element 11 enters in the first cylindrical member 101 by almost 100% through one end of the member 101 and is propagated therein toward the other end of the member 101. Since the light emitting element 11 is formed so as to emit light with a predetermined spreading angle, the so-entering light is propagated in the first cylindrical member 101 while spreading on the circumference of the first cylindrical member 101, so that the light finally reaches the light receiving element 12 at generally-equal light level in any position on the circumference of the opposite end face of the first cylindrical member 101.

Thus, as the level of light emitted from the end face of the first cylindrical member 101 is generally uniform despite the end face is rotated with respect to the light receiving element 12, it can receive the light stably.

Figure 2A:
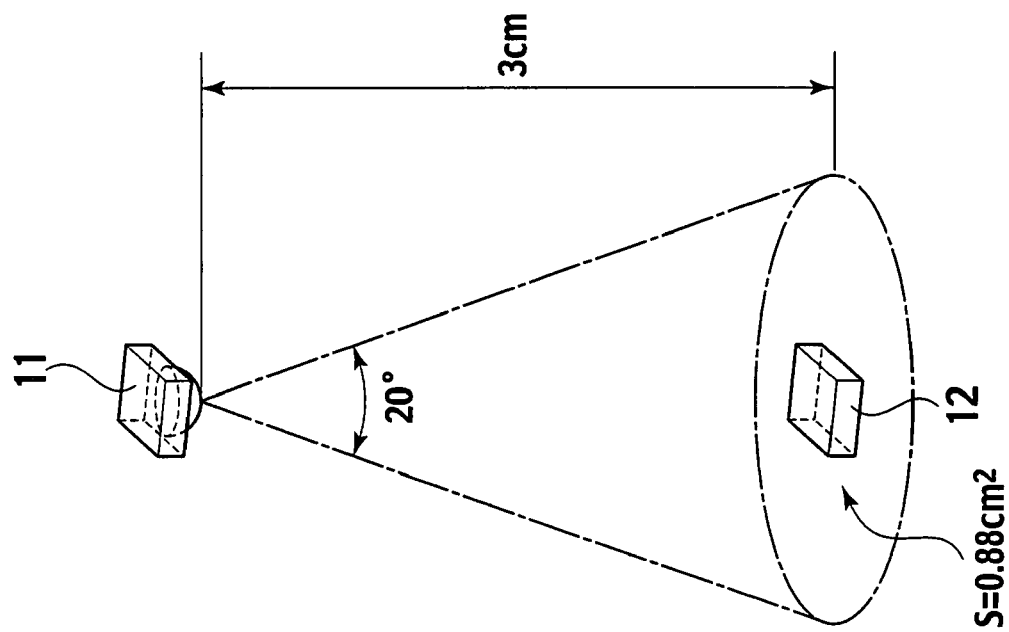
FIG. 2A is a view explaining a transmission situation where beam from a light emitting element is transmitted through space.

FIG. 2A is a view explaining a transmission situation where light (beam) from the light emitting element 11 is transmitted through space, while FIG. 2B is a view showing a transmission situation where the light from the light emitting element 11 is transmitted through the rotary joint 1.

Assume here, as shown in FIG. 2A, the light emitting element 11 has directional characteristics of 20 degrees and transmission distance of 3 cm under the spatial transmission. In addition, it is assumed to use the first cylindrical member 101 of 3 mm in inner diameter and 6 mm in outer diameter, as shown in FIG. 2B.

In case of spatial transmission shown in FIG. 2A, the light emitted from the light emitting element 11 spreads wider as going far way. In a position of the light receiving element 12 away from the light emitting element 11 at an interval of 3 cm, the area of a spot gets up to $3^2 \times p \times \tan^2(10)$=approx. 0.88 (cm$^2$).

While, in case of optical transmission through the rotary joint 11 shown in FIG. 2B, light propagated through the first cylindrical member 101 reaches the other end upon the total reflection of respective inner and outer walls of the member 101, accomplishing an effective optical transmission with little loss of light.

In detail, the light entering in the first cylindrical member 101 is uniformly distributed to an area equal to the cross section ($3^2p-0.15^2=0.21$ cm$^2$) of the first cylindrical member 101 and successively received by the light receiving element 12.

That is, the optical transmission by the rotary joint 1 of FIG. 2B can transmit light four times (=0.88÷0.21) as effectively as the optical transmission of FIG. 2A. In connection, if the transmission distance is further long, then the optical transmission is accomplished more effectively since the ratio of area gets larger.

As mentioned above, according to this embodiment, as the rotary joint 1 enables the light receiving element 12 to receive the light emitted from the light emitting element 11 stably with little loss of light, it is possible to transfer (transmit and receive) even superfine image and high-speed data stably.

Having the second cylindrical member 102 outside the first cylindrical member 101, as shown in FIGS. 1A and 1B, the rotary joint 1 is constructed so as to perform an optical transmission in a direction opposite to the optical transmission by the first cylindrical member 101.

The principle of optical transmission using the second cylindrical member 102 is similar to the above-mentioned principle in case of the first cylindrical member 101. Thus, with the combination of the first cylindrical member 101 with the second cylindrical member 102, the bi-directional optical transmission from the rotary part 2 to the stationary part 3 and vice versa can be realized.

Again, Japanese Patent Publication Laid-open No. 2001-44940 also discloses a method of eliminating interference between the bi-directional transmission signals in the interactive optical transmission. In the spatial transmission adopting an identical space as transfer medium, it is objective to reduce the above interference between the bi-directional transmission signals. On the contrary, in the rotary joint 1 of this embodiment, since the light entering in the first and second cylindrical members 101, 102 having light transmittance state is propagated up to the other ends of the members 101, 102 due to the total reflection, it is possible to provide stable interactive transmission with little generation of interference without devising any particular measure, such as masking.

In one modification of the rotary joint of FIGS. 1A and 1B adopting two cylindrical members, three or more light transmissive cylindrical members may be adopted in a rotary joint.

FIG. 3A is a perspective structural view of a rotary joint using four cylindrical members. FIG. 3B is a longitudinal sectional view of the rotary joint of the rotary joint of FIG. 3A.

As shown in FIG. 3A, the rotary joint is provided with four light emitting elements 11, 13, 15, 17 and four (first, second, third and fourth) light transmissive cylindrical members 101, 102, 103, 104. With the constitution, the rotary joint is directed to unidirectional transmission of 4-channel. The rotary joint is capable of performing a variety of optical transmissions as a result of combining bi-directional transmission with multiplex transmission, for instance, optical transmission composed of 2-channel transmission from the rotary part 2 to the stationary part 3 and 2-channel transmission from the stationary part 3 to the rotary part 2.

Further, in the rotary joint 1 of this embodiment, it is also possible to accomplish an optical transmission adopting a single light transmissive cylindrical member.

Figure 4A:
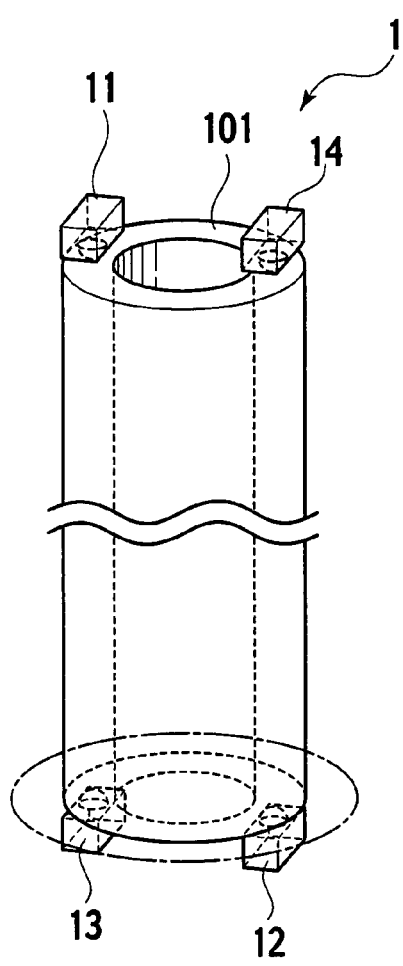
FIG. 4A is a perspective structural view of a rotary joint using a single light transmissive cylindrical member.
Figure 4B:
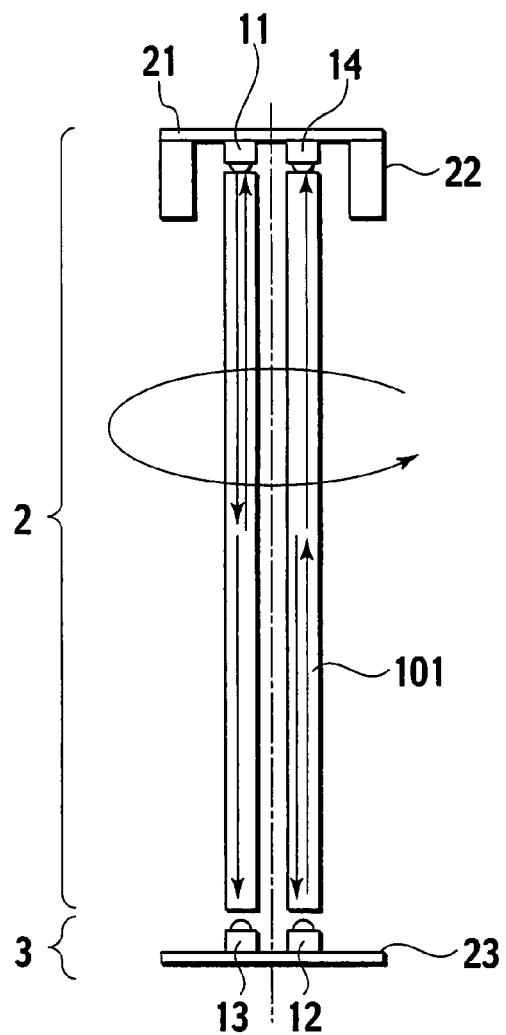
FIG. 4B is a longitudinal sectional view of the rotary joint of the rotary joint of FIG. 4A.

FIG. 4A is a perspective structural view of a rotary joint 1 using a single light transmissive cylindrical member. FIG. 4B is a longitudinal sectional view of the rotary joint 1 of the rotary joint of FIG. 4A.

In the rotary joint 1, the light emitting element 11 and the light receiving element 14 are arranged so as to abut on one end face of the first cylindrical member 101. While, the light emitting element 11 and the light receiving element 14 are positioned so as to depart from each other as possible. For example, they are arranged on the circumference of the torus-shaped end face of the first cylindrical member 101 at 180 degrees with each other, as shown in FIG. 4A.

Similarly, the light receiving element 12 and the light emitting element 13 are also arranged so as to abut on the opposite end face of the first cylindrical member 101. While, the light receiving element 12 and the light emitting element 13 are positioned so as to depart from each other as possible. For example, they are arranged on the circumference of the torus-shaped end face of the first cylindrical member 101 at 180 degrees with each other, as shown in FIG. 4A.

In operation, signal light from the light emitting element 11 enters in the first cylindrical member 101 through its one end face and advances toward the other end of the member 101. The so-propagated signal light is received by the light receiving element 12. While, signal light from the light emitting element 13 enters in the first cylindrical member 101 through the other end face and advances toward the former end face of the member 101. The so-propagated signal light is received by the light receiving element 14.

Here, it is noted that the light receiving element 12 receives not only the signal light of the light emitting element 11 but also the signal light of the light emitting element 13 on the same side, as obstructive light. However, as the signal light of the light emitting element 13 is almost propagated toward the other end of the cylindrical member 101, the optical power (light level) of the obstructive light arriving at the light receiving element 12 is substantially small, so that a sufficient U/D ratio of the signal light can be ensured. In the optical transmission from the light emitting element 13 to the light receiving element 14, similarly, the obstructive light of the light emitting element 11 does not cause any problems against the optical transmission.

In this way, it is possible to accomplish bi-directional (interactive) optical transmission through one light transmissive cylindrical member simultaneously.

We now describe some modifications of the rotary joint 1 of the embodiment, particularly, some variations of the light transmissive cylindrical member as an optical transmission medium. Note, in the following modifications, element similar to those of the above-mentioned embodiment are indicated with the same reference numerals, respectively.

1$^{st}$. Modification

FIG. 5A is a perspective structural view of a rotary joint 1 of the first modification of the embodiment of the present invention. FIG. 5B is a longitudinal sectional view of the rotary joint 1 of the first modification. FIG. 5C is a longitudinal sectional view of the rotary joint 1 of the first modification.

In the rotary joint 1 of the first modification, a light transmissive cylindrical member has at least one end in the axial direction funnel-shaped to have a slanted surface extending from an outer circumference of the light transmissive cylindrical member toward an axial center thereof at a slant. Further, either a light emitting element or a light receiving element is arranged in the vicinity of the above-shaped end of the light transmissive cylindrical member cone-shaped surface.

In detail, as shown in FIG. 5A, the rotary part 2 of the rotary joint 1 includes a fifth light transmissive cylindrical member 105. The fifth light transmissive cylindrical member 105 has one end face formed by a surface perpendicular to the rotating axis of the member 105. Through the so-formed "flat" end face, the fifth cylindrical member 105 is fixed to the rotary base plate 21 of the rotary part 2. Further, the light receiving element 12 is fixed to the rotary part 2 so that light emitted from the flat end face of the fifth cylindrical member 105 enters into the light receiving element 12. On the other hand, the stationary part 3 includes the light emitting element 11. The light emitting element 11 is arranged so as to abut on the outer circumferential surface of the fifth cylindrical member 105. The light emitting element 11 is fixed to the stationary base plate 23 in a manner that light of the element 11, which has entered into the fifth cylindrical member 105 through the outer circumferential surface of the member 105, is totally reflected on the slanted end face of the fifth cylindrical member 105.

We now describe the function of the rotary joint 1 of the first modification with reference to FIGS. 5A, 5B and 5C.

As shown in FIG. 5B, the fifth cylindrical member 105 has its lower end that is funnel-shaped toward the inside of the member 105. That is, the lower end in the form of a funnel is formed so as to extend from the outer circumference of the member 105 toward its axial center at a slant of e.g. 45 degrees to the axial direction. In the vicinity of the outer circumference of the fifth cylindrical member 105, the light emitting element 11 is fixed on the stationary base plate 23 so that its optical axis is perpendicular to the axis of the member 105.

With the above arrangement, the signal light emitted from the light emitting element 11 enters into the fifth cylindrical member 105 via its outer circumference and successively reaches the end face slanted to the axial direction of the member 105 at 45 degrees. Here, the fifth cylindrical member 105 is made from light transmissive plastic material (e.g. acrylic) and has a predetermined refractive index, for example, 1.5. Therefore, the characteristics of the member 105 meets the conditions for total reflection with respect to light entering into the member 105 at a slant of 45 degrees. As a result, the incident light is subjected to total reflection on the slanted end face forming the funnel-shaped end and subsequently, the same light is propagated in the member 105 in the axial direction. Adjacently to the other end of the fifth cylindrical member 105, the light receiving element 12 is arranged so as to align its optical axis with the axial direction of the fifth cylindrical member 105. Therefore, the light receiving element 12 can receive the signal light emitted from the light emitting element 11 and subsequently transmitted through the fifth cylindrical member (solid portion) 105.

In operation, the fifth cylindrical member 105 rotationally moves in relation to the light emitting element 11 fixed on the stationary base plate 23. In the fifth cylindrical member 105, however, there is ensured such an optical structure that always allows an incidence of the signal light from the light emitting element 11. Thus, the signal light can be transmitted toward the other end of the fifth cylindrical member 105 stably. Further, with the light's advancing in the axial direction of the fifth cylindrical member 105, the signal light gradually spreads in the circumferential direction of the member 105 and reaches the other end at homogeneous optical power irrespective of any position on the end face. Alternatively, the signal light may reach the other end of the member 105 at homogeneous optical power but insignificant variations raising no issue. In this way, the light receiving element 12 receives the signal light.

According to the rotary joint 1 of the first modification, even if the light emitting element 11 (or the light receiving element 12) is relatively large, it is possible to reduce the diameter of the fifth cylindrical member 105 by arranging such a large optical element beside the outer circumference of the member 105. In other words, it is possible to miniaturize the rotary joint 1 and also possible to reduce the manufacturing cost.

Conversely, though not shown in the figure, the light receiving element 12 may be arranged in the stationary part 3 while arranging the light emitting element 11 in the rotary part 2. Then, the light emitting element 11 rotates together with the fifth cylindrical member 105, while the light receiving element 12 remains at rest on the stationary base plate 23. In this modification, however, the favorable optical transmission could be effected similarly to the above-mentioned arrangement.

Additionally, the similar optical transmission could be effected if changing the position of the member's "flat" end face perpendicular to the axial direction to the stationary part 3 while changing the funnel-shaped end of the member 105 to the rotary part 2.

In the rotary joint 1 of FIGS. 5A, 5B and 5C, the fifth cylindrical member 105 has its one end (on the side of the stationary base plate 23) that is funnel-shaped to have a slanted surface extending from the outer circumference of the member 105 toward the axial center at 45 degrees to the axial direction. However, in a further modification, the fifth cylindrical member 105 may be formed with both ends (including the other end on the side of the rotary base plate 21) that are together funnel-shaped to have slanted surfaces extending from the outer circumference of the member 105 toward the axial center at 45 degrees to the axial direction.

FIG. 6A is a perspective structural view of the rotary joint 1 having a sixth light transmissive cylindrical member 106 whose both ends in the axial direction are together funnel-shaped to have slanted surfaces. FIG. 6B is a longitudinal sectional view of the rotary joint 1 of FIG. 6A. FIG. 6C is another longitudinal sectional view of the rotary joint 1 of FIG. 6A.

In this rotary joint of FIGS. 6A, 6B and 6C, it is possible to arrange the light emitting element 11 and the light receiving element 12 beside the outer circumference of the sixth light transmissive cylindrical member 106. FIG. 6B shows the rotary joint 1 where the light emitting element 11 and the light receiving element 12 are arranged on the opposite side of each other. FIG. 6C shows the rotary joint 1 where the light emitting element 11 and the light receiving element 12 are arranged on the same side.

$2^{nd}$. Modification

In the second modification, a light transmissive cylindrical member is provided with at least one end face tapered in one direction, allowing an optical transmission with the light emitting element or the light receiving element beside the outer circumference of the light transmissive cylindrical member.

FIG. 7A is a perspective structural view of the rotary joint 1 of the second modification. FIG. 7B is a longitudinal sectional view of the rotary joint 1 of the second modification. FIG. 7C is another longitudinal sectional view of the rotary joint 1 of the second modification.

In the rotary part 2, as shown in FIG. 7A, a seventh light transmissive cylindrical member 107 has a tapered end positioned on the side of the rotary base plate 21. The tapered end has a slanted surface slanted to the axial direction of the member 107 as if it were obtained by cutting off the flat end by an oblique plane to the axial direction of the member 107 at 45 degrees. In order to allow the light reflected on the tapered end face of the member 107 to enter in the light receiving element 12, it is fixed to the rotary base plate 21 so as to abut on the outer circumference of the member 107. In the stationary part 3, the light emitting element 11 is fixed to the stationary base plate 23 so as to abut on the outer circumference of the member 107 in order to allow the incident light to be totally reflected on the above funnel-shaped end face.

We now describe the function of the rotary joint 1 of the second modification with reference to FIGS. 7A, 7B and 7C.

With the above arrangement, as shown in FIG. 7B, the signal light emitted from the light emitting element 11 enters into the seventh light transmissive cylindrical member 107 via the outer circumference and successively reaches the funnel-shaped end face inclined to the axial direction of the seventh cylindrical member 107 at 45 degrees. Here, the seventh cylindrical member 107 is also made from light transmissive plastic material (e.g. acrylic) and has a predetermined refractive index, for example, 1.5. Therefore, the characteristics of the member 107 meets the conditions for total reflection with respect to light entering into the member 107 at a slant of 45 degrees. As a result, the incident light is subjected to total reflection on the slanted end face forming the funnel-shaped end and subsequently, the same light is propagated in the member 107 in the axial direction.

Then, the so-transmitted signal light is totally reflected on the tapered end face and enters into the light receiving element 12 adjacent to the seventh cylindrical member 107.

Conversely, though not shown in the figure, the light receiving element 12 may be arranged in the stationary part 3 while arranging the light emitting element 11 in the rotary part 2. Then, the light emitting element 11 rotates together with the cylindrical member 107, while the light receiving element 12 remains at rest on the stationary base plate 23. In this modification, however, the favorable optical transmission could be effected similarly to the above-mentioned arrangement.

In this way, owing to the provision of the tapered end face of the seventh cylindrical member 107 on the side of the rotary part 2, it is possible to increase a reflection area of the end face, improving the optical transmissive efficiency in comparison with that of the funnel-shaped end face of the sixth cylindrical member 106.

Concretely, in the arrangement where the light receiving element 12 is arranged on the side of the rotary part 2 of the seventh cylindrical member 107 with the increased reflection area at the end face, the amount of light received by the light receiving element 12 is increased to improve the optical transmissive efficiency. While, in the arrangement where the light emitting element 11 is arranged on the side of the rotary part 2 of the seventh cylindrical member 107, the amount of incident light reflected on the tapered end face is increased to improve the optical transmissive efficiency.

$3^{rd}$. Modification

In the third modification, each of the light transmissive cylindrical members of the embodiment, the first and second modifications is covered, on its inner circumferential wall, with light reflective substance (light reflective film) that allows an optical transmission (transmitting/receiving) with the light emitting element or the light receiving element on one end of the light transmissive cylindrical member.

Figure 8C:
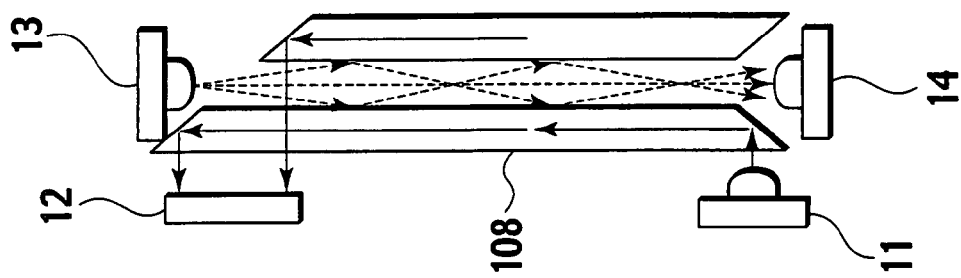
FIG. 8C is a longitudinal sectional view of the rotary joint of the third modification.
Figure 8B:
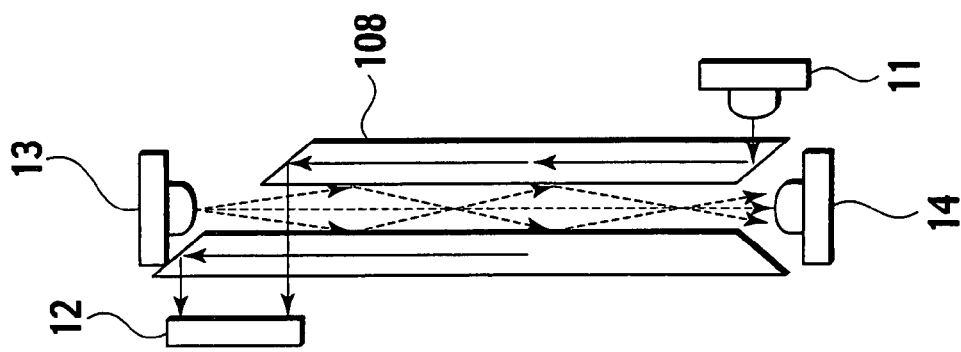
FIG. 8B is a longitudinal sectional view of the rotary joint of the third modification.
Figure 8A:
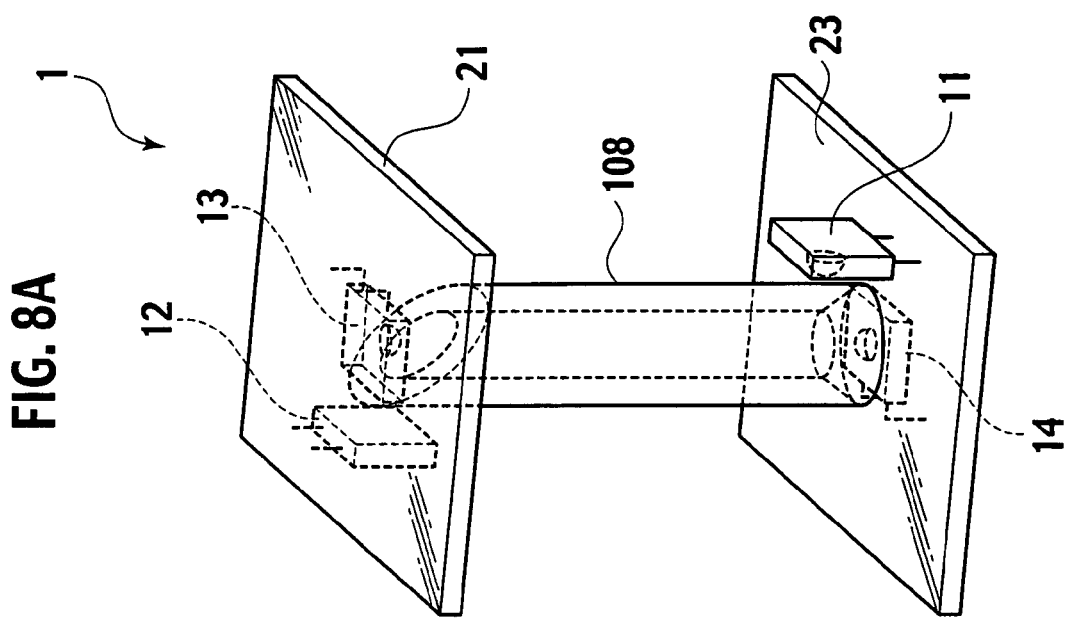
FIG. 8A is a perspective structural view of a rotary joint of a third modification of the embodiment of the present invention.

FIG. 8A is a perspective structural view of the rotary joint 1 of the third modification. FIG. 8B is a longitudinal sectional view of the rotary joint 1 of the third modification. FIG. 8C is another longitudinal sectional view of the rotary joint 1 of the third modification.

As shown in FIG. 8A, the rotary part 2 includes an eighth light transmissive cylindrical member 108 whose inner circumferential wall is covered with light reflective substance (e.g. a light reflective film) by means of vapor deposition or plating and the light emitting element 13 arranged so as to emit light to be reflected by the light reflective substance. In the stationary part 3, the light receiving element 14 is arranged so as to receive the light reflected by the light reflective substance.

We now describe the function of the rotary joint 1 of the third modification with reference to FIGS. 8A, 8B and 8C.

With the above arrangement, as shown in FIG. 8B, signal light emitted from the light emitting element 13 advances in an inner cavity of the eighth light transmissive cylindrical member 108 in the axial direction while being repeatedly reflected by the light reflective substance covering the inner circumferential wall of the member 108.

Then, the so-advanced signal light enters into the light receiving element 14 fixed to the stationary base plate 23 of the stationary part 3.

In this way, according to the third modification, it is possible to realize one optical transmission through the interior (solid portion) of the eighth light transmissive cylindrical member 108 and another optical transmission through the light reflective substance on the inner circumferential wall of the member 108 with no interference between the former optical transmission and the latter optical transmission. Note, the former optical transmission is carried out between the light emitting element 11 and the light receiving element 12, while the latter optical transmission is carried out between the light emitting element 13 and the light receiving element 14 arranged in the vicinity of both ends of the eighth light transmissive cylindrical member 108 respectively.

Different from the rotary joint shown in FIGS. 8A, 8B and 8C, conversely, the light emitting element 13 may be arranged in the stationary part 3 while arranging the light receiving element 14 in the rotary part 2. Then, the light receiving element 14 rotates together with the cylindrical member 108, while the light emitting element 13 remains at rest on the stationary base plate 23. In this modification, however, the favorable optical transmission could be effected similarly to the above-mentioned arrangement.

$4^{th}$. Modification

According to the fourth modification, the rotary joint 1 further includes a solid columnar member arranged inside the light transmissive cylindrical member in common with the embodiment, the first modification and the second modification. Thus, owing to the insertion of the columnar member, the optical transmission between a light emitting element and a light receiving element on both ends of the columnar member can be accomplished in addition to the above optical transmission through the light transmissive cylindrical member.

FIG. 9A is a perspective structural view of the rotary joint 1 of the fourth modification of the embodiment. FIG. 9B is a longitudinal sectional view of the rotary joint 1 of the fourth modification. FIG. 9C is another longitudinal sectional view of the rotary joint 1 of the fourth modification.

In detail, the rotary part 2 further includes a light transmissive columnar member 110 arranged coaxially with a light transmissive cylindrical member 109 and the light emitting element 13 abutting on the upper end face of the columnar member 110. While, the stationary part 3 includes the light receiving element 14 opposed to the light emitting element 13 through the intermediary of the columnar member 110. The light receiving element 14 is fixed on the stationary base plate 23 so as to abut on the lower end face of the columnar member 110.

We now describe the function of the rotary joint 1 of the fourth modification with reference to FIGS. 9A, 9B and 9C.

With the above arrangement, as shown in FIG. 9B, signal light emitted from the light emitting element 13 enters into the columnar member 110 through the upper end face and is propagated toward the other end (the lower end face) of the member 110. Then, the so-propagated signal light enters into the light receiving element 14. On the other hand, the signal light from light emitting element 11 enters into the ninth light transmissive cylindrical member 109 through the other end face and advances toward the end face of the member 109. Then, the same signal light enters into the light receiving element 12.

In this way, according to the fourth modification, it is possible to realize one optical transmission through the interior (solid portion) of the ninth light transmissive cylindrical member 109 and another optical transmission through the columnar member 110 with no interference between the former optical transmission and the latter optical transmission. Note, the former optical transmission is carried out between the light emitting element 11 and the light receiving element 12, while the latter optical transmission is carried out between the light emitting element 13 and the light receiving element 14 arranged in the vicinity of both ends of the columnar member 110 respectively.

Different from the rotary joint 1 shown in FIGS. 9A, 9B and 9C, conversely, the light emitting element 13 may be arranged in the stationary part 3 while arranging the light receiving element 14 in the rotary part 2. Then, the light receiving element 14 rotates together with the cylindrical member 109, while the light emitting element 13 remains at rest on the stationary base plate 23. In this modification, however, the favorable optical transmission could be effected similarly to the above-mentioned arrangement.

$5^{th}$. Modification

According to the fifth modification, the rotary joint 1 further includes at least one conductive ring fitted on the outer circumferential wall of the light transmissive cylindrical member in common with the embodiment, the first modification, the second modification, the third modification and the fourth modification. Thus, the rotary joint 1 is also directed to signal transmission through the conductive ring in slidable contact with at least one conductive brush.

Figure 10A:
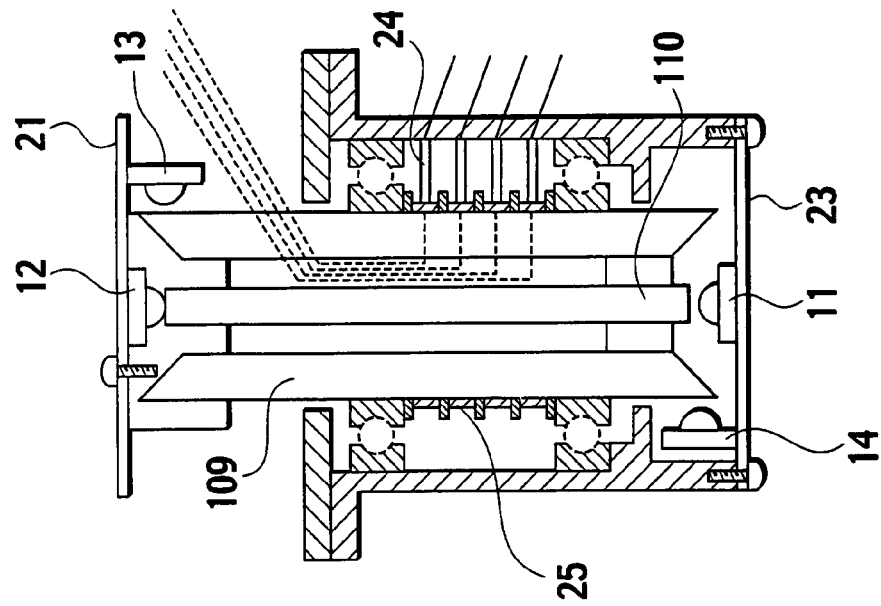
FIG. 10A is a perspective structural view of a rotary joint of a fifth modification of the embodiment of the present invention.
Figure 10B:
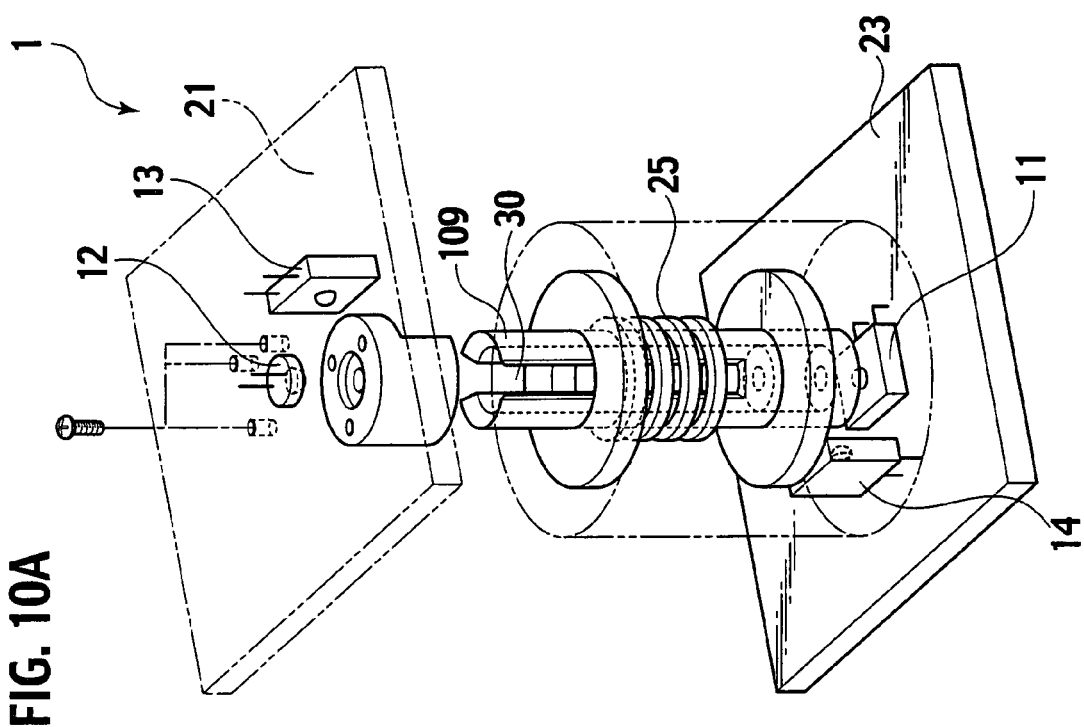
FIG. 10B is a longitudinal sectional view of the rotary joint of the fifth modification.

FIG. 10A is a perspective structural view of the rotary joint 1 of the fifth modification of the embodiment. FIG. 10B is a longitudinal sectional view of the rotary joint 1 of the fifth modification;

In the rotary part 2, as shown in FIG. 10A, the ninth light transmissive cylindrical member 109 has a slit part 30 formed so as to extend from the member's end on the side of the rotary base plate 21 along the axial direction of the member 109. Further, a plurality of conductive rings 25 are arranged on the outer circumferential wall of the ninth light transmissive cylindrical member 109. In the stationary part 3, a plurality of conductive brushes 24 are arranged so as to make contact with the conductive rings 25 respectively.

We now describe the function of the rotary joint 1 of the fifth modification with reference to FIGS. 10A and 10B.

As shown in FIG. 10B, the conductive rings 25 are arranged on the outer circumference of the ninth light transmissive cylindrical member 109 of the rotary joint 1. Correspondingly, a plurality of conductive brushes 24 are arranged in the stationary part 3 of the rotary joint 1. With the contact of the conductive rings 25 with the conductive brushes 24, electrical signals flow between the conductive rings 25 and the conductive brushes 24.

Here, it is noted that the conductive rings 25 per se rotates together with the ninth light transmissive cylindrical member 109 since they are arranged in the rotary part 2. Therefore, it is necessary to lay out respective lead wires from the conductive rings 25 inside the ninth light transmissive cylindrical member 109 in order to avoid an interference of the lead wires with the conductive brushes 24.

Thus, according to the rotary joint 1 of the fifth modification, the lead wires from the conductive rings 25 are laid out in the ninth light transmissive cylindrical member 109 so as not to interfere with the conductive brushes 24, as shown in FIG. 10A. Further, the ninth light transmissive cylindrical member 109 is provided, along the axial direction, with the slit part 30 through which the lead wires are drawn out of the member 109 again.

In this way, as the rotary joint 1 of the fifth modification has the ninth light transmissive cylindrical member 109 for transmitting superfine image and high-speed data optically in combination with the conventional slip-ring structure including the conductive rings 25 and the conductive brushes 24 as appliance couplers etc., it is possible to realize an optical slip-ring assembly capable of bi-directional (interactive) optical transmission.

In the prior art disclosed in Japanese Patent Publication Laid-open No. 2001-44940, it is necessary that a center light transmissive cylinder for leading wires accommodates either a coaxial cable for image transmission or two coaxial cables for differential transmission, causing the inner diameter of the light transmissive cylinder to be increased. As a result, the prior art device has a problem of increasing its size and manufacturing cost. On the contrary, as there is no need to lay out wires for image signals in the center light transmissive cylinder in the rotary joint of the fifth modification, it is possible to provide a compact and low-cost device.

$6^{th}$. Modification

According to the sixth modification, the rotary joint 1 further includes at least one conductive ring 25 arranged concentrically with the ninth light transmissive cylindrical member 109. Thus, the rotary joint 1 is also directed to signal transmission through the conductive ring 25 in contact with conductive brush 24.

Figure 11A:
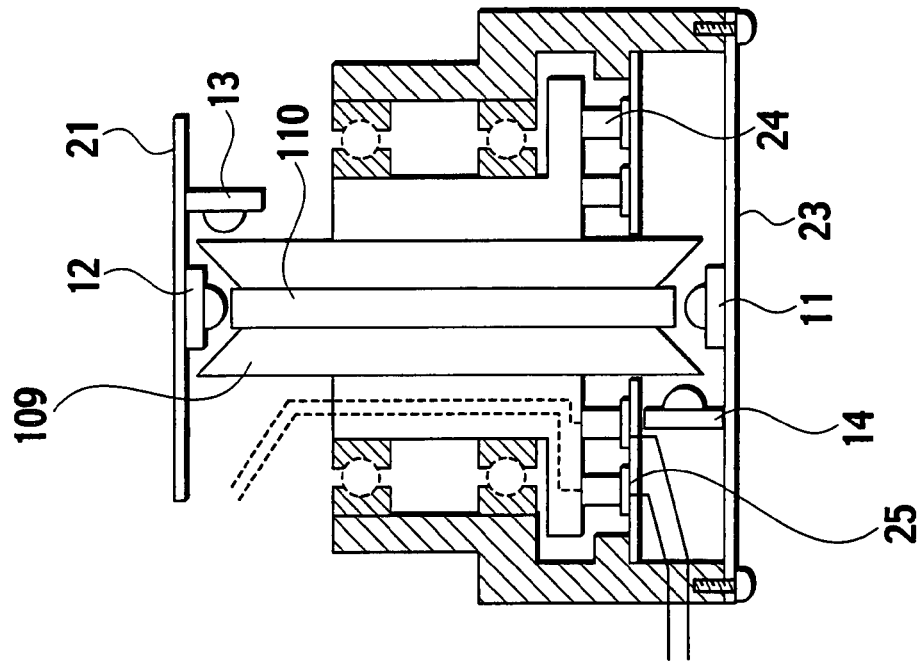
FIG. 11A is a perspective structural view of a rotary joint of a sixth modification of the embodiment of the present invention.
Figure 11B:
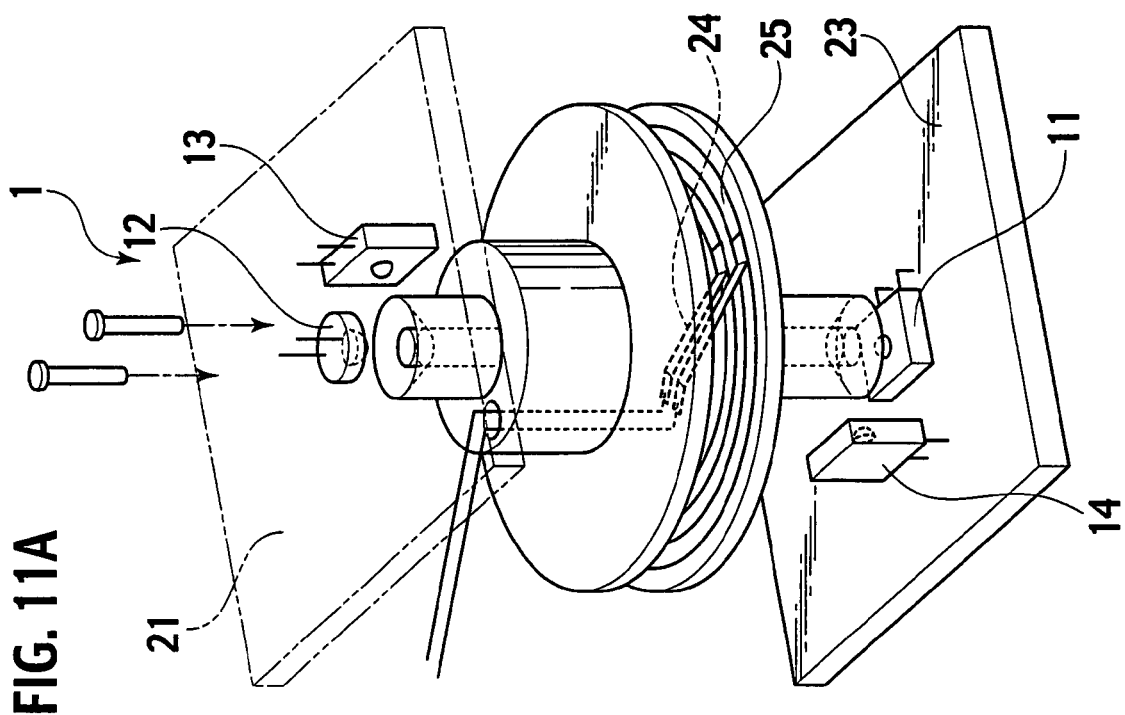
FIG. 11B is a longitudinal sectional view of the rotary joint of the sixth modification.

FIG. 11A is a perspective structural view of the rotary joint 1 of the sixth modification of the embodiment. FIG. 11B is a longitudinal sectional view of the rotary joint 1 of the sixth modification.

As shown in FIG. 11A, the rotary part 2 includes a plurality of conductive rings 25 concentrically arranged outside the outer circumference of the ninth light transmissive cylindrical member 109. While, in the stationary part 3, a plurality of conductive brushes 24 are arranged so as to male electrical contact with the conductive rings 25.

We now describe the function of the rotary joint 1 of the sixth modification with reference to FIGS. 11A and 11B.

Outside the outer circumference of the ninth light transmissive cylindrical member 109, as shown in FIG. 11B, the conductive rings 25 are arranged in a direction perpendicular to the axis of the member 109. Correspondingly, the conductive brushes 24 are arranged in the stationary part 3 of the rotary joint 1. With the contact of the conductive rings 25 with the conductive brushes 24, electrical signals flow between the conductive rings 25 and the conductive brushes 24.

In the rotary joint 1 of the fifth modification (FIGS. 10A, 10B), it is noted that the conductive rings 25 rotate together with the rotary part 2 since they are arranged on the side of the rotary part 2. Therefore, it is necessary to arrange the lead wires from the conductive rings 25 in the ninth light transmissive cylindrical member 109 in order to avoid the interference of the lead wires with the conductive brushes 24.

On the contrary, according to the sixth modification, as the rotary joint 1 includes the conductive rings 25 arranged in the direction perpendicular to the axis of the member 109, it is possible to avoid the need to arrange the lead wires from the conductive rings 25 in the ninth light transmissive cylindrical member 109 in order to avoid the interference of the lead wires with the conductive brushes 24.

Comparing with the rotary joint 1 of the fifth modification, therefore, the rotary joint 1 of the sixth modification has an advantage of no need for providing the ninth light transmissive cylindrical member 109 with the slit part 30 for drawing out the lead wires again.

$7^{th}$. Modification

In the above-mentioned rotary joint 1 of the fifth modification, as shown in FIG. 10A, the lead wires form the conductive rings 25 are arranged in the ninth light transmissive cylindrical member 109 so as to avoid the interference with the conductive brushes 24. Further, in order to draw the lead wires out of the member 109 again, the slit part 30 is formed in the ninth light transmissive cylindrical member's part (109) on the side of the rotary base plate 21 so as to extend in the axial direction of the member 109.

In connection with the so-formed rotary joint 1, for weight/size saving in the device, it is preferable to shorten the axial length of a member's part (109) having no slit part, as possible. However, it should be noted that such a shortening of the axial length may be an obstacle in optical transmission.

Figure 12A:
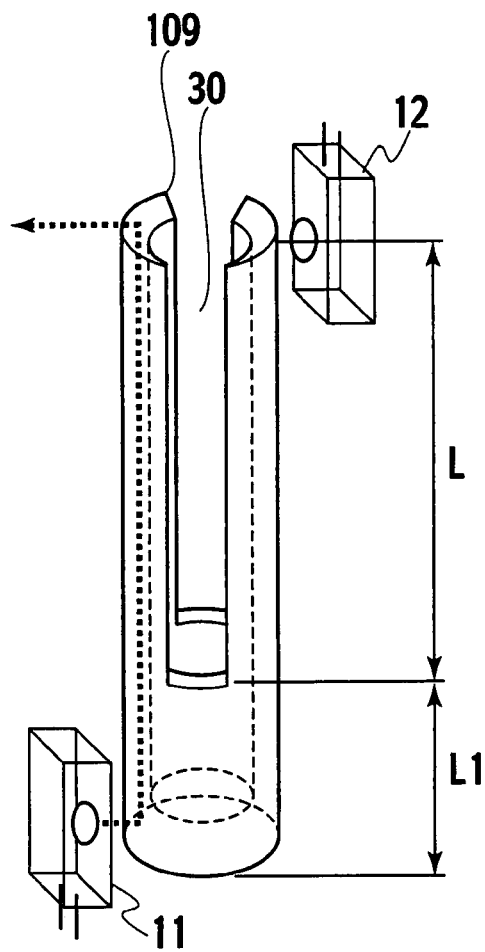
FIG. 12A is a perspective view of a light transmissive cylindrical member having a slit.
Figure 12B:
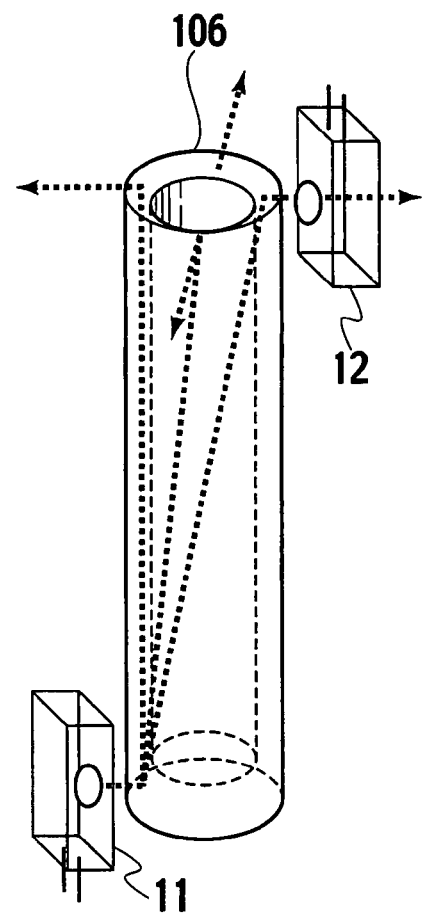
FIG. 12B is a perspective view of a light transmissive cylindrical member having no slit.

For instance, as shown in FIG. 12B, if the rotary joint 1 is provided with the sixth light transmissive cylindrical member 106 existing without the slit part 30, the light emitted from the light emitting element 11 enters into the sixth light transmissive cylindrical member 106 and advances toward the other end of the member 106. Since the light emitting element 11 is adapted so as to emit the light with a predetermined spreading angle, the light is propagated in the sixth light transmissive cylindrical member 106 while spreading in the circumferential direction of the member 106. Consequently, the light can reach the light receiving element 12 at generally-equal light level in any position on the circumference of the other end face of the sixth light transmissive cylindrical member 106.

Thus, in spite of the end face's rotating of the sixth light transmissive cylindrical member 106 in relation to the light emitting element 1, the light receiving element 12 is capable of stably receiving constant optical signals since the optical power (light level) of light emitted from the end face of the member 106 is generally even.

In the ninth light transmissive cylindrical member 109 shown in FIG. 12A, however, if reducing an axial length L1 of a member's part having no slit part, then there arises a shortage of a distance for the signal light of the light emitting element 11 to be propagated around in the circumferential direction of the member 109 due to the so-reduced axial length L1. Therefore, if the light receiving element 12 is positioned on the opposite side of the light emitting element 11 in the circumferential direction of the ninth light transmissive cylindrical member 109 (see FIG. 12A), the amount of light received by the light receiving element 12 is reduced since the amount of light propagated around in the circumferential direction of the member 109 is reduced. That is, if reducing the axial length L1, there is a possibility that the light receiving element 12 cannot receive signal light having enough optical power to generate an electrical signal.

Under the above situation, the rotary joint 1 of the seventh modification is directed to homogenization in the distribution of optical radiation in the circumferential direction of the ninth light transmissive cylindrical member 109 having the slit part 30, accomplishing stable optical transmission irrespective of the positional relationship between the light emitting element 11 and the light receiving element 12, with a simple structure of the device.

Figure 13A:
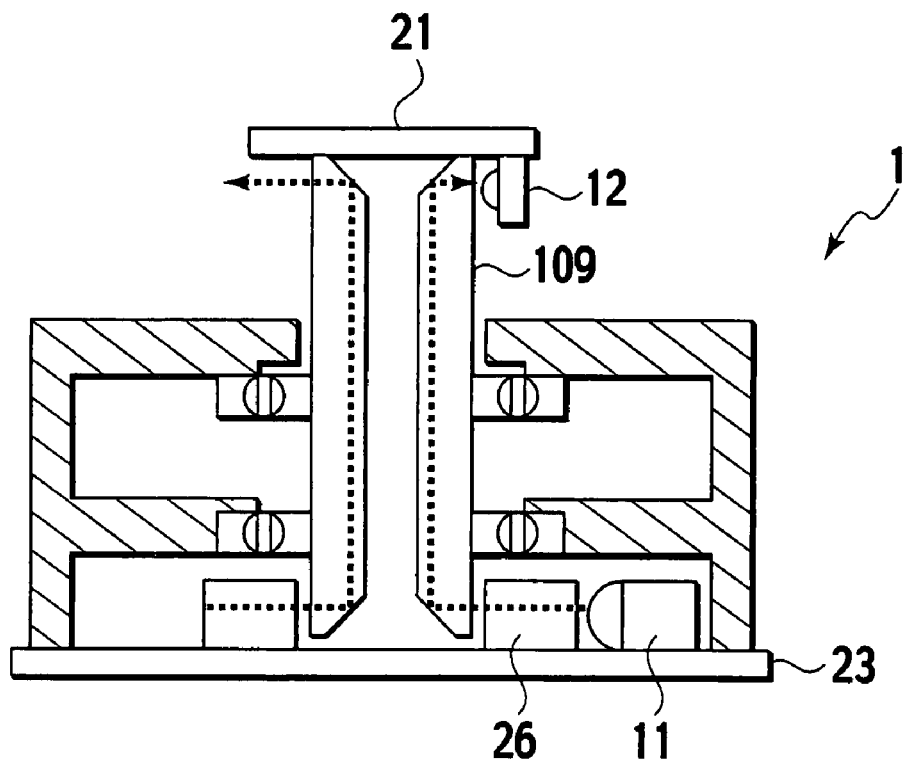
FIG. 13A is a longitudinal sectional view of a rotary joint of a seventh modification of the embodiment of the present invention.
Figure 13B:
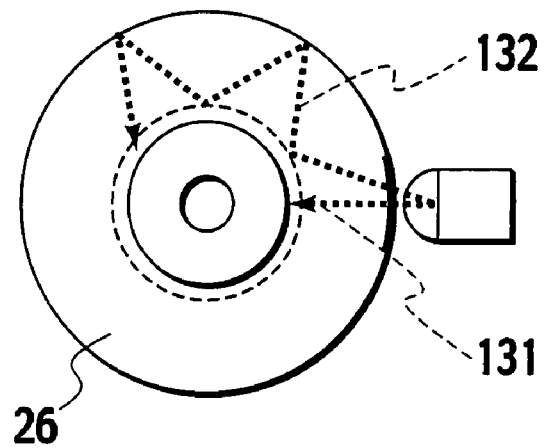
FIG. 13B is a cross sectional view of the rotary joint of the seventh modification of the embodiment of the present invention.

FIG. 13A is a longitudinal sectional view of the rotary joint 1 of the seventh modification. FIG. 13B is a cross sectional view of the rotary joint 1 of the seventh modification.

As shown in FIG. 13A, the rotary joint 1 of the seventh modification further includes a first light dispersion member 26 on the side of the stationary part 3 in addition to the constituents of the rotary joint 1 of the fifth modification.

The first light dispersion member 26 is shaped to be annular. In the first light dispersion member 26, its outer circumferential part has an inner wall covered with a light reflective film, except for a predetermined surface area through which the signal light of the light emitting element 11 enters into the member 26. In the inner circumferential part of the member 26, its inner wall is also covered with a light reflective film at regular intervals in the circumferential direction of the member 26.

Further, the first light dispersion member 26 is arranged in coaxial with the rotating axis of the ninth light transmissive cylindrical member 109, as shown in FIG. 13A. In plan view, the first light dispersion member 26 is arranged so as to surround the light transmissive cylindrical member 109 close to the funnel-shaped lower end having the slanted surface. In other words, on the light path between the light emitting element 11 and the funnel-shaped end of the member 109, the first light dispersion member 26 is arranged so that its inner circumference abuts on the outer circumference of the member 109.

We now describe the function of the rotary joint 1 of the seventh modification with reference to FIGS. 13A and 13B.

As shown in FIG. 13A, the signal light emitted from the light emitting element 11 firstly enters into the first light dispersion member 26. Then, the incident light is dispersed in the member 26 uniformly and enters into the ninth light transmissive cylindrical member 109.

As shown in FIG. 13B, the first light dispersion member 26 is formed by an annular light transmissive member. In the first light dispersion member 26, its outer and inner circumferential surfaces are formed so as to have excellent smoothness. In the outer circumferential surface, its surface part is covered with the above light reflective film except for a predetermined surface area allowing an incidence of the signal light of the light emitting element 11. The light reflective film on the outer circumferential surface is provided, on the side of the light dispersion member (main body) 26, with a reflection surface. Similarly, the inner circumferential surface of the member 26 is covered with the light reflective film. This light reflective film on the inner circumferential surface is also provided, on the side of the light dispersion member (main body) 26, with a reflection surface.

With the above-mentioned structure, the signal light of the light emitting element 11, which has been transmitted through the outer circumferential part of the member 26 covered with no light reflective film, is subjected to repetitive reflections between the light reflective film covering the inner circumferential surface of the member 26 and the light reflective film covering the outer circumferential surface and thereafter, the signal light enters into the ninth light transmissive cylindrical member 109.

For instance, a signal light 131 shown in FIG. 13B passes through the outer circumferential part of the member 26 covered with no light reflective film and successively, through the inner circumferential part of the member 26 covered with no light reflective film and enters into the ninth light transmissive cylindrical member 109 finally.

On the other hand, another signal light 132 passes through the outer circumferential part of the member 26 covered with no light reflective film. Subsequently, the signal light 132 is subjected to repetitive reflection between the light reflective film on the inner circumferential surface of the member 26 and the light reflective film on the outer circumferential surface and thereafter, the signal light 132 enters into the ninth light transmissive cylindrical member 109.

Then, the incident signal light in the ninth light transmissive cylindrical member 109 is propagated in the direction of the rotating axis of the ninth light transmissive cylindrical member 109 and further reflected by the funnel-shaped end face of the member 109 totally. Thereafter, the signal light is received by the light receiving element 12 beside the member 109.

Thus, due to repetitive reflections, the signal light enters into the ninth light transmissive cylindrical member 109 through not only the member's part near the light emitting element 11 but also the whole circumferential parts of the member 109.

Consequently, by modifying both interval and shape of the light reflective film covering the inner circumferential surface of the first light dispersion member 26, it is possible to allow the incident signal light to be dispersed in the member 26 generally uniformly, so that the amount of light entering into the ninth light transmissive cylindrical member 109 can be controlled to be substantially uniform.

Even if the light transmissive cylindrical member is provided with a slit part, such as the slit part 30 of the ninth light transmissive cylindrical member 109, it is possible to homogenize the distribution of optical radiation in the circumferential direction of the light transmissive cylindrical member, accomplishing stable optical transmission irrespective of the positional relationship between the light emitting element 11 and the light receiving element 12.

In this way, according to the rotary joint 1 of the seventh modification, the compact optical transmission between the stationary part and the rotary part rotatably assembled to the stationary part can be realized in parvo and at low price and additionally, it is possible to transmit even superfine image and high-speed data stably.

Preferably, the first light dispersion member 26 has both end faces (in the optic axial direction) covered with light reflective films, as well. However, since the ninth light transmissive cylindrical member 109 fulfils the condition of total reflection at both end faces, the above light reflective films on both end faces of the first light dispersion member 26 are not indispensable.

$8^{th}$. Modification

Figure 14A:
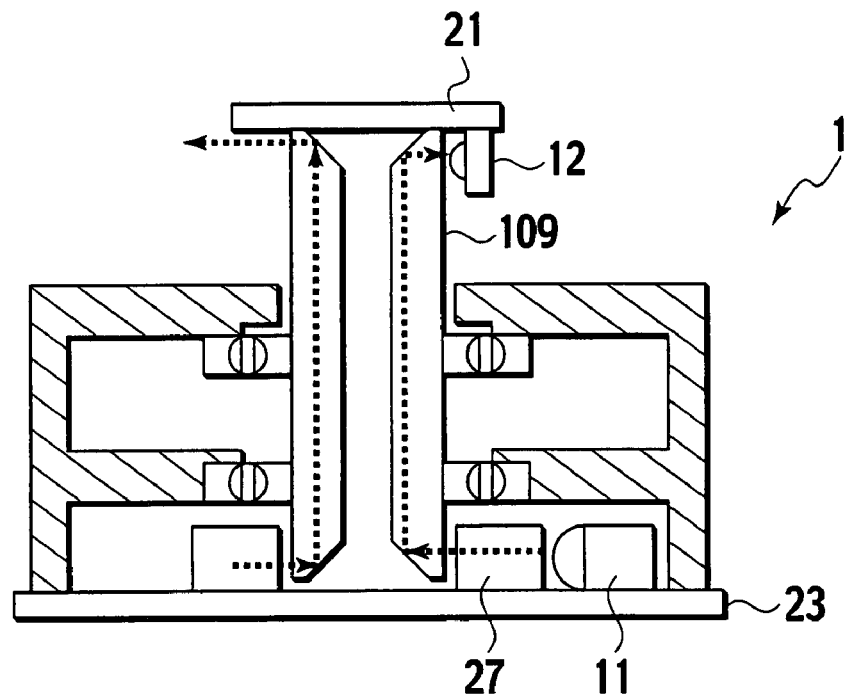
FIG. 14A is a longitudinal sectional view of a rotary joint of an eighth modification of the embodiment of the present invention.
Figure 14B:
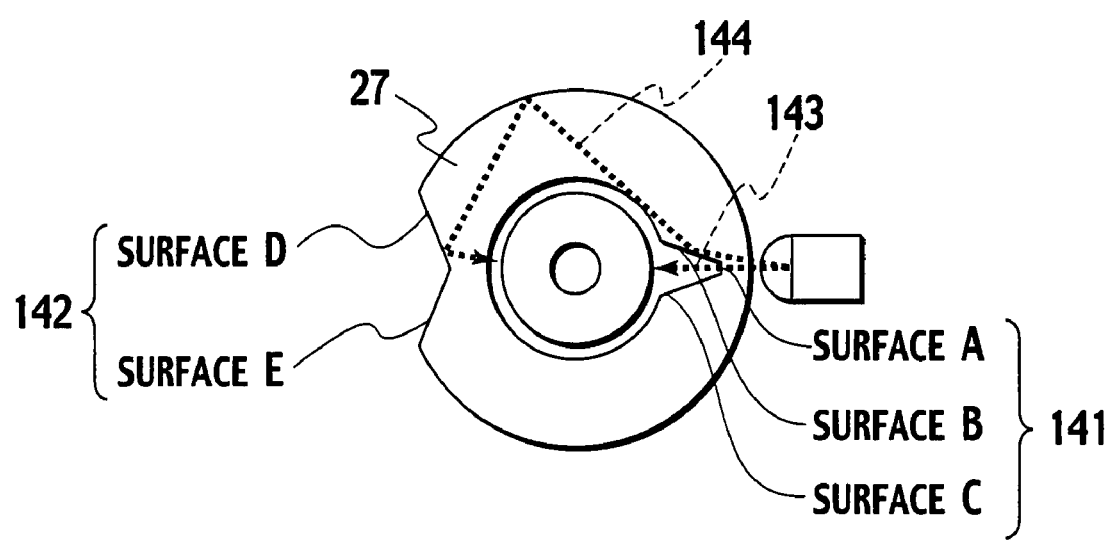
FIG. 14B is a cross sectional view of the rotary joint of the eighth modification of the embodiment of the present invention.

FIG. 14A is a longitudinal sectional view of the rotary joint 1 of the eighth modification of the embodiment. FIG. 14B is a cross sectional view of the rotary joint 1 of the eighth modification.

In the seventh modification mentioned above, the rotary joint 1 is provided with the first light dispersion member 26 in which its outer circumferential surface except for the predetermined area on the side of the light emitting element 11 is covered with the light reflective film, while the inner circumferential surface is covered with the light reflective film at regular intervals.

On the contrary, the rotary joint 1 of the eight modification includes a second light dispersion member 27 of light transmissive, which has notches formed at angles allowing the incident light from the light emitting element 11 to be subjected to total reflection, as shown in FIG. 14A.

In detail, as shown in FIG. 14B, the second light dispersion member 27 is provided with a first notch 141 and a second notch 142.

We now describe the function of the rotary joint 1 of the eighth modification with reference to FIGS. 14A and 14B.

As shown in FIG. 14A, the signal light emitted from the light emitting element 11 firstly enters into the second light dispersion member 27. Then, the incident light is dispersed in the member 27 uniformly and enters into the ninth light transmissive cylindrical member 109.

As mentioned above, the second light dispersion member 27 is made of light transmissive material. The first notch 141 is formed on the inner circumference of the member 27, while the second notch 142 is formed on the outer circumference of the member 27 in a position symmetrical to the first notch 141 over the center axis of the ninth light transmissive cylindrical member 109. The first notch 141 is defined by one surface A concentric to the optical axis and two surfaces B, C each formed at an angle for the total reflection of signal light from the light emitting element 11. The second notch 142 is defined by two surfaces D, E each formed at an angle for the total reflection of signal light from the light emitting element 11.

In the signal light emitted from the light emitting element 11, the signal reaching the surface A passes through the surface A and enters into the ninth light transmissive cylindrical member 109.

For instance, a signal light 143 of FIG. 14B is transmitted through the surface A of the second light dispersion member 27 and directly advances into the ninth light transmissive cylindrical member 109.

While, the signal lights reaching the surfaces B, C are subjected to total reflection on the surfaces B, C. Subsequently, the signal lights are further full-reflected by the inner wall of the outer circumferential part of the second light dispersion member 27 and the surfaces D, E and finally enter into the ninth light transmissive cylindrical member 109.

For instance, a signal light 144 of FIG. 14B reaches the surface B and is full-reflected on the surface B. Subsequently, the signal light 144 is further full-reflected by the inner wall of the outer circumferential part of the second light dispersion member 27. Then, the so-reflected signal light reaches the surface D and is full-reflected on the surface D. Thereafter, the signal light 144 enters into the ninth light transmissive cylindrical member 109.

Thus, due to repetitive reflections, the signal light enters into the ninth light transmissive cylindrical member 109 through not only the member's part near the light emitting element 11 but also the whole circumferential parts of the member 109.

Consequently, by modifying the shapes of the inner and outer circumferential parts of the second light dispersion member 27, it is possible to control the distribution of optical radiation on the whole inner circumference of the member 27. In detail, the angles of the surfaces B, C, D, and E may be optimized so as to uniform the distribution of optical radiation on the whole inner circumference. Alternatively, a number of reflecting surfaces may be formed in the member 27. Further, the reflecting surfaces may be formed by curved surfaces.

Consequently, even if the light transmissive cylindrical member is provided with a slit part, such as the slit part 30 of the ninth light transmissive cylindrical member 109, it is possible to homogenize the distribution of optical radiation in the whole inner circumference of the light transmissive cylindrical member, accomplishing stable optical transmission irrespective of the positional relationship between the light emitting element 11 and the light receiving element 12. Additionally, as the second light dispersion member 27 can homogenize the distribution of optical radiation without any light reflective film, the manufacturing cost of the rotary joint 1 can be further saved by spending neither material cost for the light reflective film nor its coating step in comparison with the rotary joint 1 of the seventh modification.

In a further modification, it is also possible to combine the first light dispersion member 26 of the seventh modification with the second light dispersion member 27 of the eighth modification. That is, also by combining one reflective form due to the light reflective film with another reflective form due to the shape of the light dispersion member 27, it is possible to homogenize the distribution of optical radiation in the whole inner circumference of the light transmissive cylindrical member.

Similarly to the first light dispersion member 26, preferably, the second light dispersion member 27 has both end faces (in the optic axial direction) covered with light reflective films, as well. However, since the ninth light transmissive cylindrical member 109 fulfils the condition of total reflection at both end faces, the above light reflective films on both end faces of the second light dispersion member 27 are not indispensable.

$9^{th}$. Modification

FIG. 15 is a longitudinal sectional view of the rotary joint 1 of the ninth modification of the embodiment.

In addition to the constituents of the fifth modification, the rotary joint 1 of the ninth modification includes a first light reflective member 28 in the stationary part 3. The first light reflective member 28 is provided with a slanted surface on which either light reflective treatment or light reflective film is applied and which provides a reflective optical path between the light emitting element 11 and one end of the ninth light transmissive cylindrical member 109.

In detail, as shown in FIG. 15, the first light reflective member 28 has reflective surfaces F, G for reflecting the signal light emitted from the light emitting element 11 in the direction of rotating axis of the ninth light transmissive cylindrical member 109.

In the signal light emitted from the light emitting element 11, as shown in FIG. 15, a signal light 151 reaches the reflective surface F and is reflected in the axial direction of the ninth light transmissive cylindrical member 109.

Another signal light 152 reaches the reflective surface G and is also reflected in the axial direction of the ninth light transmissive cylindrical member 109.

The area ratio between the surface F and the surface G may be set to 5:5. Alternatively, the area ratio between the surface F and the surface G may be determined corresponding to a ratio between an optical path from the light emitting element 11 up to the member 109 through the surface F and an optical path from the light emitting element 11 up to the member 109 through the surface G.

Then, the signal light entering into the ninth light transmissive cylindrical member 109 is propagated in the direction of rotating axis of the member 109 and further full-reflected on the end face of the member 109. Successively, the so-reflected signal light is received by the light receiving element 12 beside the member 109.

Consequently, even if the light transmissive cylindrical member is provided with a slit part, such as the slit part 30 of the ninth light transmissive cylindrical member 109, it is possible to homogenize the distribution of optical radiation in the whole inner circumference of the light transmissive cylindrical member, accomplishing stable optical transmission irrespective of the positional relationship between the light emitting element 11 and the light receiving element 12.

In connection, the reflective surface F and the reflective surface G may be incorporated into a signal surface. However, it should be noted that the illustrated two-plane structure of the surfaces F, G allows a height of the first light reflective member 28 to be reduced in the axial direction in comparison with the above incorporation into a single surface. Thus, it is possible to miniaturize a device equipped with the rotary joint 1.

10$^{th}$. Modification

FIG. 16 is a longitudinal sectional view of the rotary joint 1 of the tenth modification of the embodiment.

As shown in FIG. 16, the rotary joint 1 of the tenth modification includes the light emitting element 11, the light receiving element 12, a second light reflective member 20 and a tenth light transmissive cylindrical member 111.

The tenth light transmissive cylindrical member 111 is provided, on the side of the light emitting element 11, with a slanted end face I in the form of a truncated-conical projection. The end face I is formed so as to extend from the outer circumference of the member 111 toward the center axis at a slant. Further, the tenth light transmissive cylindrical member 111 is provided, on the side of the light receiving element 12, with a slanted end face J in the form of a funnel. The end face J is also formed so as to extend from the outer circumference of the member 111 toward the center axis at a slant.

The second light reflective member 29 is provided with a slanted surface H on which either light reflective treatment or light reflective film is applied. In the stationary part 3, the second light reflective member 29 is fixed on the stationary base plate so as to provide a reflective optical path between the light emitting element 11 and one end of the tenth light transmissive cylindrical member 111.

The light emitting element 11 is fixed on the stationary base plate 23 of the stationary part 3 so as to abut on the outer circumference of the tenth light transmissive cylindrical member 111.

The light receiving element 12 is fixed on the rotary base plate 21 so as to receive the light emitted from the inclined end face of the tenth light transmissive cylindrical member 111.

We now describe the function of the rotary joint 1 of the tenth modification with reference to FIG. 16.

As mentioned above, the lower end face of the tenth light transmissive cylindrical member 111 is formed so as to be a truncated-conical projection. In detail, the same end face is slanted from the outer circumference of the member 111 toward the rotating axis at a predetermined angle. Further, the tenth light transmissive cylindrical member 111 is also provided with a slit part (like the slit part 30 of FIG. 12A) although it is not shown in the figure.

Abutting on the outer circumference of the tenth light transmissive cylindrical member 111, the light emitting element 11 is arranged so as to have its optical axis perpendicular to the axis of the tenth light transmissive cylindrical member 111.

The second light reflective member 29 changes the optical axis of a signal light emitted from the light emitting element 11, which is relatively far from the tenth light transmissive cylindrical member 111, to the axial direction of the member 111.

Thus, as shown in FIG. 16, a signal light 161 relatively far from the tenth light transmissive cylindrical member 111 is reflected on the second light reflective member 29 to turn in the direction of the rotating axis of the tenth light transmissive cylindrical member 111 and enters into the member 111.

On the other hand, a signal light 162 relatively close to the tenth light transmissive cylindrical member 111 enters into the same member 111 through the end face I. Here, the tenth light transmissive cylindrical member 111 is formed by a plastic member, such as light transmissive acryl, having a refractive index of 1.5. Therefore, the signal light 162 passes through the end face I without being reflected thereon.

Thereafter, the signal light 162 enters into the tenth light transmissive cylindrical member 111 again and reaches the end face I on the opposite side. Here, as the tenth light transmissive cylindrical member 111 has the refractive index of e.g. 1.5, the conditions of total reflection are met against the light arriving at the end face I.

As a result, the incident signal light 162 is full-reflected on the end face I and further transmitted in the direction of the rotating axis of the tenth light transmissive cylindrical member 111.

Here, it is noted that the signal light 162 is refracted by the end face I when firstly entering into the tenth light transmissive cylindrical member 111 through the end face I. In consideration of the refractive angle, therefore, it is necessary to establish an inclination angle of the end face I of the member 111 so that the signal light 162 is finally reflected in the direction of the rotating axis of the member 111.

FIGS. 17A and 17B are views explaining the inclination angle of the end face I of the tenth light transmissive cylindrical member 111. In these figures, FIG. 17A is an explanatory view in case of 45 degrees in the inclination angle, while FIG. 17B is an explanatory view in case of 38 degrees in the inclination angle. It is herein assumed that the tenth light transmissive cylindrical member 111 is made from acrylic material. The light emitting element 11 is formed by light emission diode (LED). The signal light from this LED has a wavelength of 850 nm.

As shown in FIG. 17A, a signal light 171 enters into the tenth light transmissive cylindrical member 111 through the end face I. Simultaneously, the signal light 171 is also refracted by the end face I since the tenth light transmissive cylindrical member 111 has a refractive index of 1.5.

Thereafter, the signal light 171 refracted by the end face I enters into the tenth light transmissive cylindrical member 111 again. In the member 111, the signal light 171 is full-reflected by the end face I inclined to the direction of the rotating axis of the member 111 at 45 degrees.

As shown in FIG. 17A, however, it is noted that the signal light 171 is reflected somewhat outwardly of the direction of the rotating axis of the member 111 due to the refraction in the first entrance into the member 111 through the end face I.

Therefore, as shown in FIG. 17B, the formation of the end face I of the member 111 is modified so that the inclination angle becomes gentle to the direction of the rotating axis of the member 111, in other words, the projecting end of the member 111 is radicalized furthermore. For instance, the inclination angle is selected within the range from 35 to 45 degrees, more preferably, 38 degrees.

With the above establishment of the inclination angle, consequently, a signal light 172 arriving at the end face I is reflected thereon and turned to the direction of the rotating axis of the member 111.

The example illustrated in FIGS. 17A and 17B stands under the condition of the tenth light transmissive cylindrical member 111 made from acrylic material and the wavelength of 850 nm. In reality, as a refraction angle changes depending on the wavelength of the signal light and the material of the member 111 on selection, it is necessary to set an inclination angle of the end face I in accordance with the refraction angle.

In this way, as shown in FIGS. 16A and 16B, the signal lights 161, 162 turned to the axial direction at the end face I of the tenth light transmissive cylindrical member 111 are transmitted in the member 111 and finally received by the light receiving element 12 beside the outer circumference of the member 111.

In operation, the tenth light transmissive cylindrical member 111 rotates in relation to the light emitting element 11 in the stationary part 3. Nevertheless, as the tenth light transmissive cylindrical member 111 is provided with the above-mentioned optical structure that always allows an incidence of the signal light from the light emitting element 11, the signal light can be propagated toward the other end of the tenth light transmissive cylindrical member 111 stably.

Further, as the signal light emitted from the light emitting element 11 is reflected by the second light reflective member 29 and the end face of the tenth light transmissive cylindrical member 111, the light receiving element 12 can receive the signal light under condition that the distribution of optical radiation has been generally homogenized in the whole inner circumference of the member 111.

Consequently, in spite of the slit part 30 in the tenth light transmissive cylindrical member 111, it is possible to homogenize the distribution of optical radiation in the whole inner circumference of the light transmissive cylindrical member 111, accomplishing stable optical transmission irrespective of the positional relationship between the light emitting element 11 and the light receiving element 12.

In a further modification, the light emitting element 11 and the second light reflective member 29 may be arranged in the rotary part 2 while arranging the light receiving element 12 in the stationary part 3. Then, the light emitting element 11 rotates together with the tenth light transmissive cylindrical member 111, while the light receiving element 12 is stable in position. In this modification also, the favorable optical transmission could be effected similarly to the above-mentioned arrangement.

11$^{th}$. Modification

Figure 18:
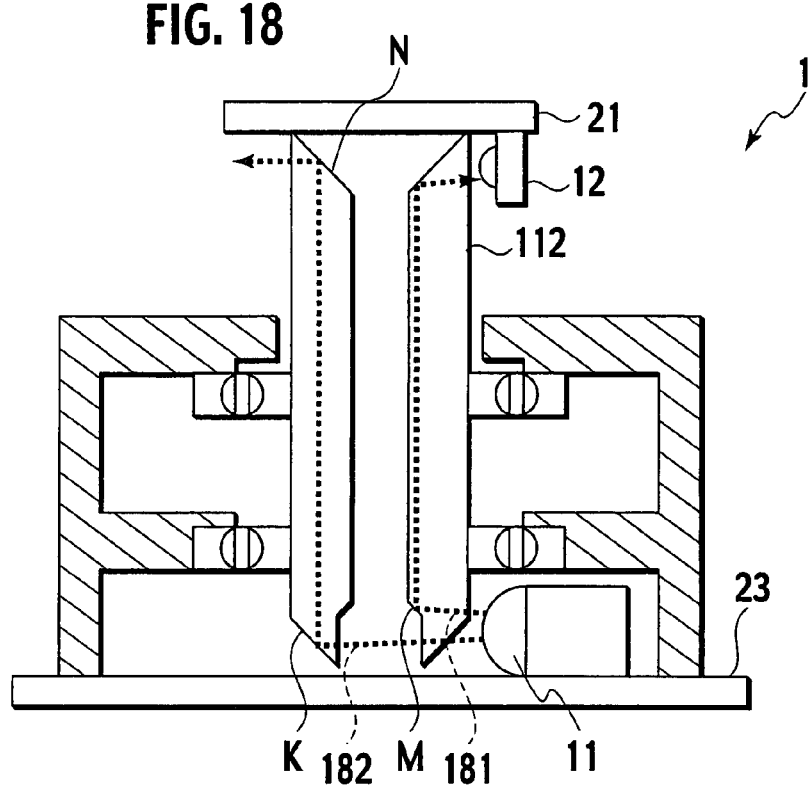
FIG. 18 is a longitudinal sectional view of a rotary joint of an eleventh modification of the embodiment of the present invention.

FIG. 18 is a longitudinal sectional view of the rotary joint 1 of the eleventh modification of the embodiment.

As shown in FIG. 18, the rotary joint 1 of the eleventh modification includes the light emitting element 11, the light receiving element 12 and an eleventh light transmissive cylindrical member 112.

The eleventh light transmissive cylindrical member 112 is provided, on the side of the light emitting element 11, with an end face having one funnel-shaped slanted surface M and another slanted surface K in the form of a truncated-conical projection. The slanted surface M is arranged on the inner circumferential side of the member 112. Further, the slanted surface M is shaped so as to extend from the outer circumferential side of the member 112 toward the center at a slant. While, the slanted surface K is arranged on the outer circumferential side of the member 112. The slanted surface K is also formed so as to extend from the outer circumference of the member 112 toward the center axis at a slant.

Further, the eleventh light transmissive cylindrical member 112 is provided, on the side of the light receiving element 12, with a funnel-shaped slanted surface N. The slanted surface N is formed so as to extend from the outer circumference of the member 112 toward the center at a slant.

Further, the eleventh light transmissive cylindrical member 112 is also provided with a slit part (like the slit part 30 of FIG. 12A) although it is not shown in the figure.

The light emitting element 11 is fixed on the stationary base plate 23 of the stationary part 3 so as to abut on the outer circumference of the eleventh light transmissive cylindrical member 112.

The light receiving element 12 is fixed on the rotary base plate 21 so as to receive the light emitted from the end face of the eleventh light transmissive cylindrical member 112.

We now describe the function of the rotary joint 1 of the eleventh modification with reference to FIG. 18.

As mentioned above, the "inside" end face (slanted surface) M of the eleventh light transmissive cylindrical member 112 is funnel-shaped. In detail, the same end face M is slanted from the outer circumferential side of the member 112 toward the axial center at a predetermined angle.

Abutting on the outer circumference of the eleventh light transmissive cylindrical member 112, the light emitting element 11 is arranged so as to have its optical axis perpendicular to the axis of the eleventh light transmissive cylindrical member 112.

Thus, as shown in FIG. 18, an upper signal light 181 from the light emitting element 11 enters into the eleventh light transmissive cylindrical member 112 and reaches the inside end face M of the member 112.

Here, the eleventh light transmissive cylindrical member 112 is formed by a plastic member, such as light transmissive acryl, having the refractive index of e.g. 1.5. Therefore, the conditions of total reflection are met against the light arriving at the inside end face M.

As a result, the incident signal light 181 is full-reflected on the inside end face M and further transmitted in the direction of the rotating axis of the eleventh light transmissive cylindrical member 112.

On the other hand, as shown in FIG. 18, the "outside" end face (slanted surface) K of the eleventh light transmissive cylindrical member 112 is formed so as to be a truncated-conical projection. In detail, the same end face K is slanted so as to extend from the outer circumference of the member 112 toward the rotating axis at a predetermined angle.

Therefore, a relatively-lower signal light 182 from the element 11 enters into the eleventh light transmissive cylindrical member 112 through the outside end face K. It is noted herein that the eleventh light transmissive cylindrical member 112 has the refractive index of e.g. 1.5. However, the signal light 182 passes through the outside end face K without being reflected thereon since the incident angle of the light 182 is too small.

Thereafter, the signal light 182 enters into the eleventh light transmissive cylindrical member 112 again and reaches the outside end face K on the opposite side. Here, as the eleventh light transmissive cylindrical member 112 has the refractive index of e.g. 1.5, the conditions of total reflection are met against the light arriving at the end face K.

As a result, the incident signal light 182 is full-reflected on the end face K and further transmitted in the direction of the rotating axis of the eleventh light transmissive cylindrical member 112.

Here, it is noted that the signal light 182 is refracted by the outside end face K when firstly entering into the eleventh light transmissive cylindrical member 112 through the end face K. In consideration of the refractive angle, it is necessary to establish an inclination angle of the end face K of the member 112 so that the signal light 182 is finally reflected in the direction of the rotating axis of the member 112, as similar to the tenth light transmissive cylindrical member 111 of the tenth modification.

In this way, the signal lights 181, 182 transmitted in the member 112 are full-reflected by the end face N and finally received by the light receiving element 12 beside the outer circumference of the member 112.

In operation, the eleventh light transmissive cylindrical member 112 rotates in relation to the light emitting element 11 in the stationary part 3. Nevertheless, as the eleventh light transmissive cylindrical member 112 is provided with the above-mentioned optical structure that always allows an incidence of the signal light from the light emitting element 11, the signal light can be propagated toward the other end of the eleventh light transmissive cylindrical member 112 stably.

Further, as the signal light emitted from the light emitting element 11 is reflected by the outside end face K and the inside end face M of the eleventh light transmissive cylindrical member 112, the light receiving element 12 can receive the signal light under condition that the distribution of optical radiation has been generally homogenized in the whole inner circumference of the member 112.

Consequently, in spite of the slit part 30 in the eleventh light transmissive cylindrical member 112, it is possible to homogenize the distribution of optical radiation in the whole inner circumference of the light transmissive cylindrical member 112, accomplishing stable optical transmission irrespective of the positional relationship between the light emitting element 11 and the light receiving element 12.

In a further modification, the light emitting element 11 may be arranged in the rotary part 2 while arranging the light receiving element 12 in the stationary part 3. Then, the light emitting element 11 rotates together with the eleventh light transmissive cylindrical member 112, while the light receiving element 12 is stable in position. In this modification also, the favorable optical transmission could be effected similarly to the above-mentioned arrangement.

12$^{th}$. Modification

Figure 19:
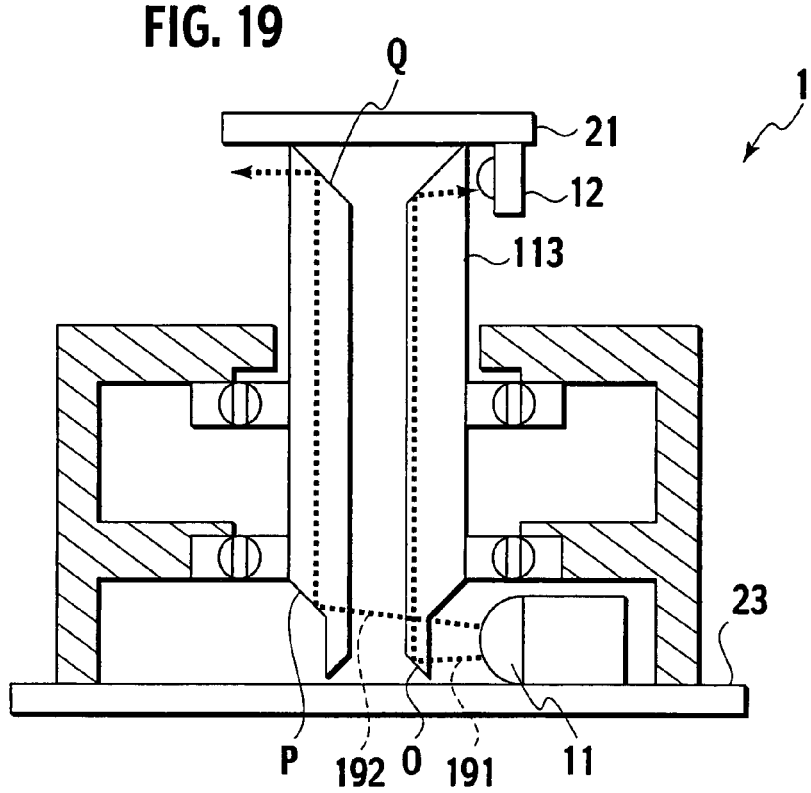
FIG. 19 is a longitudinal sectional view of a rotary joint of a twelfth modification of the embodiment of the present invention.

FIG. 19 is a longitudinal sectional view of the rotary joint 1 of the twelfth modification of the embodiment.

As shown in the figure, the rotary joint 1 of the twelfth modification includes the light emitting element 11, the light receiving element 12 and a twelfth light transmissive cylindrical member 113.

The twelfth light transmissive cylindrical member 113 is provided, on the side of the light emitting element 11, with an end face having one funnel-shaped slanted surface O and another truncated-conical slanted surface P. The "inside" slanted surface O is arranged on the inner circumferential side of the member 113. Further, the slanted surface O is shaped so as to extend from the outer circumferential side of the member 113 toward the center at a slant. While, the "outside" slanted surface P is arranged on the outer circumferential side of the member 113. The slanted surface P is also formed so as to extend from the outer circumference of the member 113 toward the center axis at a slant.

Further, the twelfth light transmissive cylindrical member 113 is provided, on the side of the light receiving element 12, with a funnel-shaped slanted surface Q. The slanted surface Q is formed so as to extend from the outer circumference of the member 113 toward the center at a slant.

Further, the twelfth light transmissive cylindrical member 113 is also provided with a slit part (like the slit part 30 of FIG. 12A) although it is not shown in the figure.

The light emitting element 11 is fixed on the stationary base plate 23 of the stationary part 3 so as to abut on the outer circumference of the twelfth light transmissive cylindrical member 113.

The light receiving element 12 is fixed on the rotary base plate 21 so as to receive the light emitted from the end face of the twelfth light transmissive cylindrical member 113.

We now describe the function of the rotary joint 1 of the twelfth modification with reference to FIG. 19.

As mentioned above, the "inside" end face (slanted surface) O of the twelfth light transmissive cylindrical member 113 is funnel-shaped. In detail, the same end face O is slanted from the outer circumferential side of the member 113 toward the axial center at a predetermined angle.

Abutting on the outer circumference of the twelfth light transmissive cylindrical member 113, the light emitting element 11 is arranged so as to have its optical axis perpendicular to the axis of the twelfth light transmissive cylindrical member 113.

Thus, as shown in FIG. 19, a relatively-low signal light 191 from the light emitting element 11 enters into the twelfth light transmissive cylindrical member 113 and reaches the inside end face O of the member 113.

Here, the twelfth light transmissive cylindrical member 113 is formed by a plastic member, such as light transmissive acryl, having the refractive index of e.g. 1.5. Therefore, the conditions of total reflection are met against the light arriving at the inside end face O.

As a result, the incident signal light 191 is full-reflected on the inside end face O and further transmitted in the direction of the rotating axis of the twelfth light transmissive cylindrical member 113.

On the other hand, as shown in FIG. 19, the "outside" end face (slanted surface) P of the twelfth light transmissive cylindrical member 113 is formed so as to be a truncated cone. In detail, the same end face P is slanted so as to extend from the outer circumference of the member 113 toward the rotating axis at a predetermined angle.

Therefore, an upper signal light 192 from the element 11 enters into the twelfth light transmissive cylindrical member 113 through the outside end face P. It is noted herein that the twelfth light transmissive cylindrical member 113 has the refractive index of e.g. 1.5. However, the signal light 192 passes through the outside end face P without being reflected thereon since the incident angle of the light 192 is too small.

Thereafter, the signal light 192 enters into the twelfth light transmissive cylindrical member 113 again and reaches the outside end face P on the opposite side. Here, as the tenth light transmissive cylindrical member 113 has the refractive index of e.g. 1.5, the conditions of total reflection are met against the light arriving at the outside end face P.

As a result, the incident signal light 192 is full-reflected on the end face P and further transmitted in the direction of the rotating axis of the twelfth light transmissive cylindrical member 113.

Here, it is noted that the signal light 19 is refracted by the outside end face P when firstly entering into the twelfth light transmissive cylindrical member 113 through the outside end face P. Therefore, in consideration of the refractive angle, it is necessary to establish an inclination angle of the outside end face P of the member 113 so that the signal light 192 is finally reflected in the direction of the rotating axis of the member 113, as similar to the tenth light transmissive cylindrical member 111 of the tenth modification.

In this way, the signal lights 181, 182 transmitted in the member 113 are finally received by the light receiving element 12 beside the outer circumference of the member 113.

In operation, the twelfth light transmissive cylindrical member 113 rotates in relation to the light emitting element 11 in the stationary part 3. Nevertheless, as the twelfth light transmissive cylindrical member 113 is provided with the above-mentioned optical structure that always allows an incidence of the signal light from the light emitting element 11, the signal light can be propagated toward the other end of the twelfth light transmissive cylindrical member 113 stably.

Further, as the signal light emitted from the light emitting element 11 is reflected by the outside end face P and the inside end face O of the twelfth light transmissive cylindrical member 113, the light receiving element 12 can receive the signal light under condition that the distribution of optical radiation has been generally homogenized in the whole inner circumference of the member 113.

Consequently, in spite of the slit part 30 in the twelfth light transmissive cylindrical member 113, it is possible to homogenize the distribution of optical radiation in the whole inner circumference of the light transmissive cylindrical member 113, accomplishing stable optical transmission irrespective of the positional relationship between the light emitting element 11 and the light receiving element 12.

In a further modification, the light emitting element 11 may be arranged in the rotary part 2 while arranging the light receiving element 12 in the stationary part 3. Then, the light emitting element 11 rotates together with the twelfth light transmissive cylindrical member 113, while the light receiving element 12 remains at rest on the stationary base plate 23. In this modification also, the favorable optical transmission could be effected similarly to the above-mentioned arrangement.

Hereinabove, variations of the embodiment of the present invention have been described, particularly, in terms of the light transmissive cylindrical member as the light transmissive media. In the light transmissive cylindrical member or the light reflective member of each modification, the light transmissive (or reflective) end faces and the reflective surfaces are not always required to be flat. They may be shaped to be curve.

Particularly, if the light emitting element 11 has a widespread radiation characteristic or if widespread light is emitted from the light transmissive cylindrical member into the light receiving element 12, the light receiving element 12 could receive more light by forming the respective reflective surfaces (or end faces) so as to be optimally flat or curved as the need arises.

According to the rotary joint of the invention, it is possible to accomplish the optical transmission between the stationary part and the rotary part rotatable to the stationary part in parvo and at low price. Additionally, it is also possible to transmit and receive even superfine images and high-speed data stably.

Finally, it will be understood by those skilled in the art that the foregoing descriptions are nothing but the embodiment and various modifications of the disclosed rotary joint and therefore, various changes and modifications may be made within the scope of claims.

What is claimed is:

1. A rotary joint for transmitting optical signals, comprising:
    a stationary part; and
    a rotary part which is rotatable about an axis against the stationary part, wherein the rotary part includes a rotary base plate, a light transmissive cylindrical member formed with a predetermined thickness, the light transmissive cylindrical member being fixed on the rotary base plate coaxially with the axis, and a first optical unit arranged on a first end of the light transmissive cylindrical member in an axial direction thereof and fixed on the rotary base plate, and
    the stationary part includes a stationary base plate arranged closely to a second end of the light transmissive cylindrical member and a second optical unit fixed on the stationary base plate close to the second end of the light transmissive cylindrical member, the second optical unit pairing with the first optical unit of the rotary part, whereby the optical signals are transmitted between the first optical unit and the second optical unit through the light transmissive cylindrical member, wherein
    at the rotary part end, a first light emitting element and a first light receiving element, which are included in the first optical unit and arranged in opposite positions on a circumference, having a light emitting part and a light receiving part of those elements provided on a base plate of the rotary part, close to the first end of the cylindrical member;
    at the stationary part end, a second light emitting element and a second light receiving element, which are included in the second optical unit and arranged in opposite positions on a circumference, having a light emitting part and a light receiving part of these elements provided on a base plate of the stationary part, close to the second end of the cylindrical member; and
    the cylindrical member having an outside surface and an inside surface of a lateral side thereof reflecting light of signals to be transmitted between the first light emitting element and the second light receiving element and between the second light emitting element and the first light receiving element.

2. The rotary joint of claim 1, wherein
    the light transmissive cylindrical member has at least one end thereof in the axial direction funnel-shaped to have a slanted surface extending from an outer circumference of the light transmissive cylindrical member toward an center thereof at a slant, and
    the first optical unit or the second optical unit is arranged beside the outer circumference of the light transmissive cylindrical member close to the slanted surface.

3. The rotary joint of claim 2, further comprising a light dispersion member shaped to be annular and made from light transmissive material, wherein
    the light dispersion member is arranged so as to surround the light transmissive cylindrical member close to the slanted surface,
    the light dispersion member has an outer circumferential surface covered with a light reflective film except for a predetermined surface area close to the first optical unit or the second optical unit, and
    the light dispersion member has an inner circumferential surface covered with a light reflective film at regular intervals.

4. The rotary joint of claim 2, further comprising a light dispersion member shaped to be annular and made from light transmissive material, wherein
    the light dispersion member is arranged so as to surround the light transmissive cylindrical member close to the slanted surface,
    the light dispersion member is provided, on both inner and outer circumferences thereof, with notches enabling light transmitted in the light dispersion member to be reflected totally.

5. The rotary joint of claim 1, wherein
    the inside surface of the light transmissive cylindrical member is covered with a light reflective film,
    the rotary part further includes a third optical unit fixed on the rotary base plate close to the first end of the light transmissive cylindrical member, and
    the stationary part further includes a fourth optical unit fixed on the stationary base plate close to the second end of the light transmissive cylindrical member so as to pair with the third optical unit.

6. The rotary joint of claim 1, wherein
    the rotary part further includes a light transmissive columnar member arranged inside the light transmissive cylindrical member coaxially with the axis,
    the rotary part further includes a third optical unit fixed on the rotary base plate close to a first end of the light transmissive columnar member, and the stationary part further includes a fourth optical unit fixed on the stationary base plate close to a second end of the light transmissive columnar member so as to pair with the third optical unit.

7. The rotary joint of claim 1, wherein the light transmissive cylindrical member has a slit part formed so as to extend from the light transmissive cylindrical member's end on the side of the rotary base plate along the axial direction, the rotary part further includes at least one conductive ring fixed on the outer circumference of the light transmissive cylindrical member, the conductive ring having a lead wire attached thereto, the stationary part further includes at least one conductive brush arranged so as to make a slidable contact with the conductive ring, and the lead wire is drawn out of the light transmissive cylindrical member through an inside space thereof and the slit part.

8. The rotary joint of claim 1, wherein the light transmissive cylindrical member has at least one end thereof in the axial direction shaped to be a truncated-conical projection having a slanted surface extending from an outer circumference of the light transmissive cylindrical member toward an center thereof at a slant, and the first optical unit or the second optical unit is arranged beside the outer circumference of the light transmissive cylindrical member close to the slanted surface.

9. The rotary joint of claim 8, wherein the light transmissive cylindrical member has a funnel-shaped slanted surface formed close to the slanted surface forming the truncated-conical projection.

10. The rotary joint of claim 1, further comprising a light reflective member arranged close to the end of the light transmissive cylindrical member, wherein the light reflective member is provided with a slanted surface which is directed to either the first optical unit or the second optical unit and on which a light reflective treatment or a light reflective film is applied.

11. A rotary joint for transmitting optical signals, comprising:

a stationary part; and a rotary part which is rotatable about an axis against the stationary part, wherein the rotary part includes a rotary base plate, a plurality of light transmissive cylindrical members each formed with a predetermined thickness, the light transmissive cylindrical members being arranged concentrically with the axis and fixed on the rotary base plate coaxially with the axis, and a first optical unit arranged with respect to each of the light transmissive cylindrical members and positioned close to a first end of the each light transmissive cylindrical member in an axial direction thereof and fixed on the rotary base plate, and the stationary part includes a stationary base plate arranged closely to second ends of the light transmissive cylindrical members and a second optical unit arranged with respect to each of the light transmissive cylindrical members and fixed on the stationary base plate close to the second end of the each light transmissive cylindrical member, the second optical unit pairing with the first optical unit of the rotary part, whereby the optical signals are transmitted between the first optical unit and the second optical unit through the light transmissive cylindrical members, wherein at the rotary part end, a first light emitting element and a first light receiving element, which are included in the first optical unit and arranged in opposite positions on a circumference of one of the light transmissive cylindrical members, having a light emitting part and a light receiving part of those elements provided on a base plate of the rotary part, close to the first end of the cylindrical member;

at the stationary part end, a second light emitting element and a second light receiving element, which are included in the second optical unit and arranged in opposite Positions on a circumference of the one of the light transmissive cylindrical members, having a light emitting part and a light receiving part of these elements provided on a base plate of the stationary part, close to the second end of the cylindrical member; and the one of the cylindrical members having an outside surface and an inside surface of a lateral side thereof reflecting light of signals to be transmitted between the first light emitting element and the second light receiving element and between the second light emitting element and the first light receiving element.

12. The rotary joint of claim 11, wherein, in the light transmissive cylindrical members, the inside surface of the light transmissive cylindrical member positioned closest to the axis is covered with a light reflective film, the rotary part further includes a third optical unit fixed on the rotary base plate close to the first end of the light transmissive cylindrical member, and the stationary part further includes a fourth optical unit fixed on the stationary base plate close to the second end of the light transmissive cylindrical member so as to pair with the third optical unit.

13. The rotary joint of claim 11, wherein the rotary part further includes a light transmissive columnar member arranged inside the light transmissive cylindrical member coaxially with the axis, the rotary part further includes a third optical unit fixed on the rotary base plate close to a first end of the light transmissive columnar member, and the stationary part further includes a fourth optical unit fixed on the stationary base plate close to a second end of the light transmissive columnar member so as to pair with the third optical unit.

* * * * *